(12) United States Patent
Shigihara et al.

(10) Patent No.: US 8,792,496 B2
(45) Date of Patent: Jul. 29, 2014

(54) MULTIPLEXING TRANSMISSION SYSTEM, MULTIPLEXING APPARATUS, DEMULTIPLEXING APPARATUS AND A MULTIPLEXING TRANSMISSION SYSTEM

(75) Inventors: Masahiro Shigihara, Tokyo (JP); Toru Takamichi, Tokyo (JP)

(73) Assignee: NEC Corporation, Tokyo (JP)

( * ) Notice: Subject to any disclaimer, the term of this patent is extended or adjusted under 35 U.S.C. 154(b) by 366 days.

(21) Appl. No.: 13/260,273

(22) PCT Filed: Mar. 26, 2010

(86) PCT No.: PCT/JP2010/055332
§ 371 (c)(1),
(2), (4) Date: Sep. 24, 2011

(87) PCT Pub. No.: WO2010/110413
PCT Pub. Date: Sep. 30, 2010

(65) Prior Publication Data
US 2012/0027020 A1    Feb. 2, 2012

(30) Foreign Application Priority Data
Mar. 26, 2009   (JP) .................................. 2009-077717

(51) Int. Cl.
*H04L 12/56*    (2006.01)
*H04L 12/54*    (2013.01)
(52) U.S. Cl.
CPC .................................. *H04L 12/5601* (2013.01)
USPC ....................................... 370/395.1; 370/436
(58) Field of Classification Search
CPC ...... H04L 12/56; H04L 12/5601; H04L 5/023
USPC .............. 370/310, 343, 345, 351, 389, 395.1, 370/431, 436, 464, 465, 473, 474
See application file for complete search history.

(56) References Cited

U.S. PATENT DOCUMENTS 6,430,183 B1 *   8/2002  Satran et al. ................... 370/389
2003/0012191 A1 *  1/2003  Matsumura ................... 370/389

FOREIGN PATENT DOCUMENTS

| JP | 591081 A | 4/1993 |
| JP | 11163884 A | 6/1999 |
| JP | 200216581 A | 1/2002 |
| JP | 200749751 A | 2/2007 |
| JP | 2007235614 A | 9/2007 |
| JP | 2008118344 A | 5/2008 |

* cited by examiner

*Primary Examiner* — Obaidul Huq
(74) *Attorney, Agent, or Firm* — Sughrue Mion, PLLC

(57) ABSTRACT

A multiplexing apparatus stores fixed length data into which information signals supplied from channels are divided; determines an output channel by selecting the each channel cyclically; acquires the fixed length data from the output channel based on a channel multiplexing ratio number to store the fixed length data in a payload in turn; adds assignment information to the payload; and creates a multiplexing frame by using the payload to transmit to a transmission channel. A demultiplexing apparatus detects the assignment information from the payload of the multiplexing frame received to the transmission channel; creates distribution information for distributing the fixed length data to each channel based on the assignment information; detects the fixed length data from the payload to distribute the fixed length data to each channel based on the distribution information; and couples the fixed length data to reproduce the information signal.

26 Claims, 24 Drawing Sheets

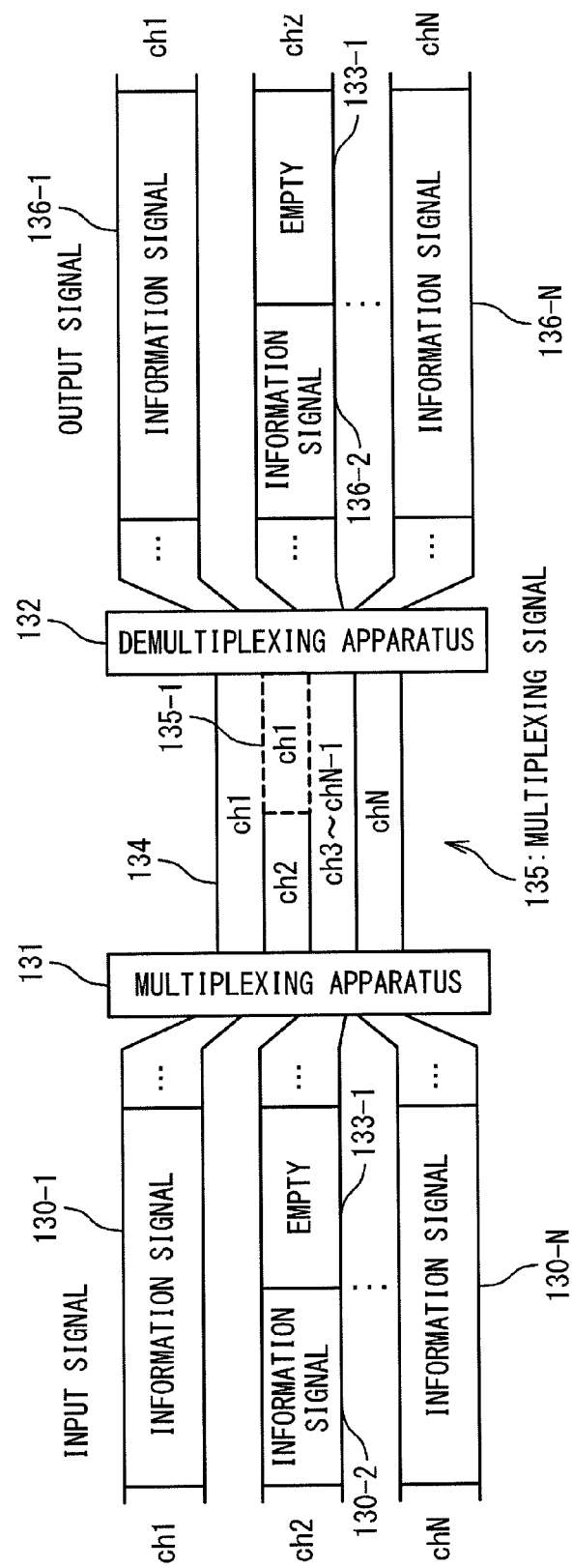

TIME →

TIME →

TIME →

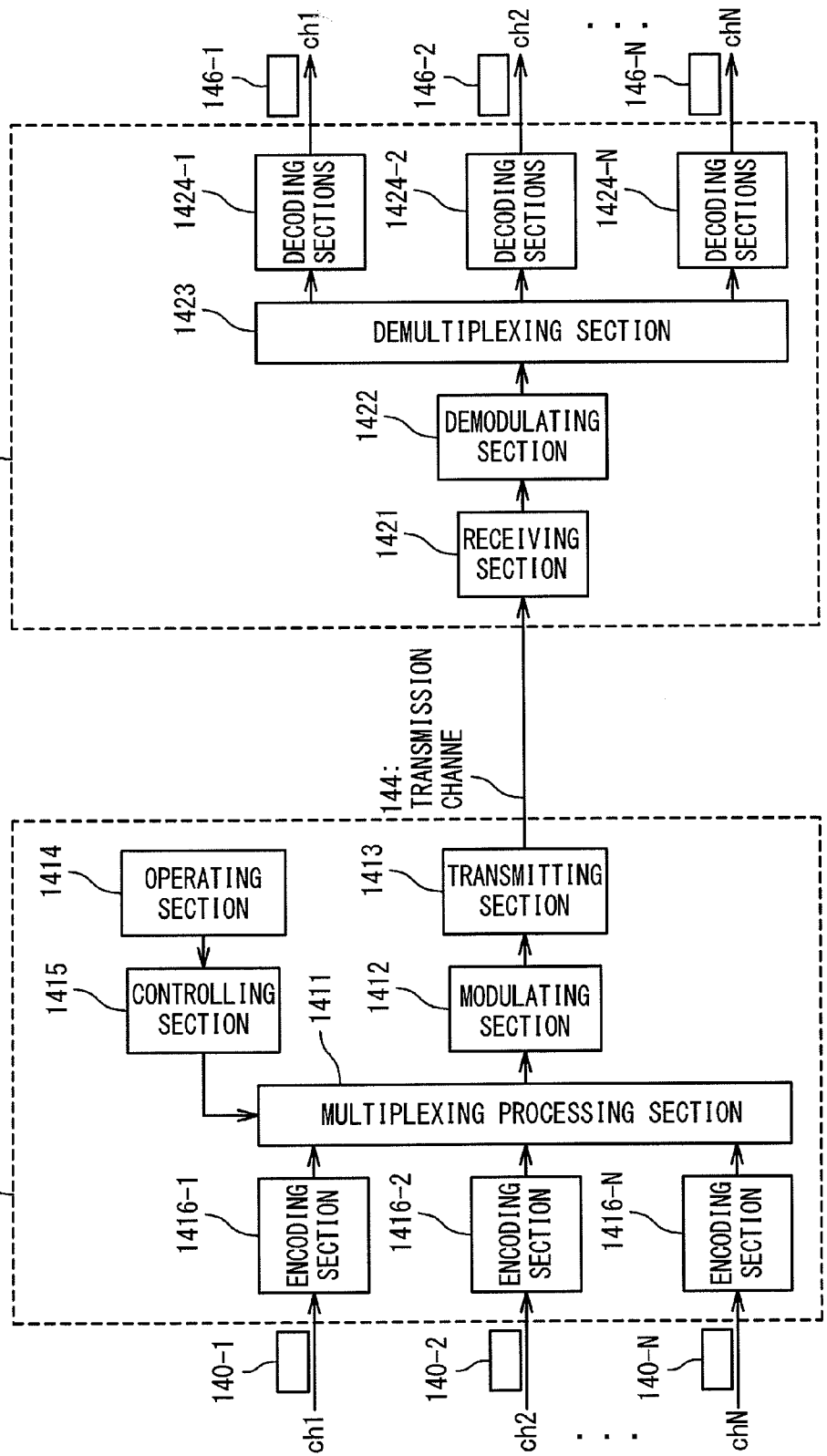

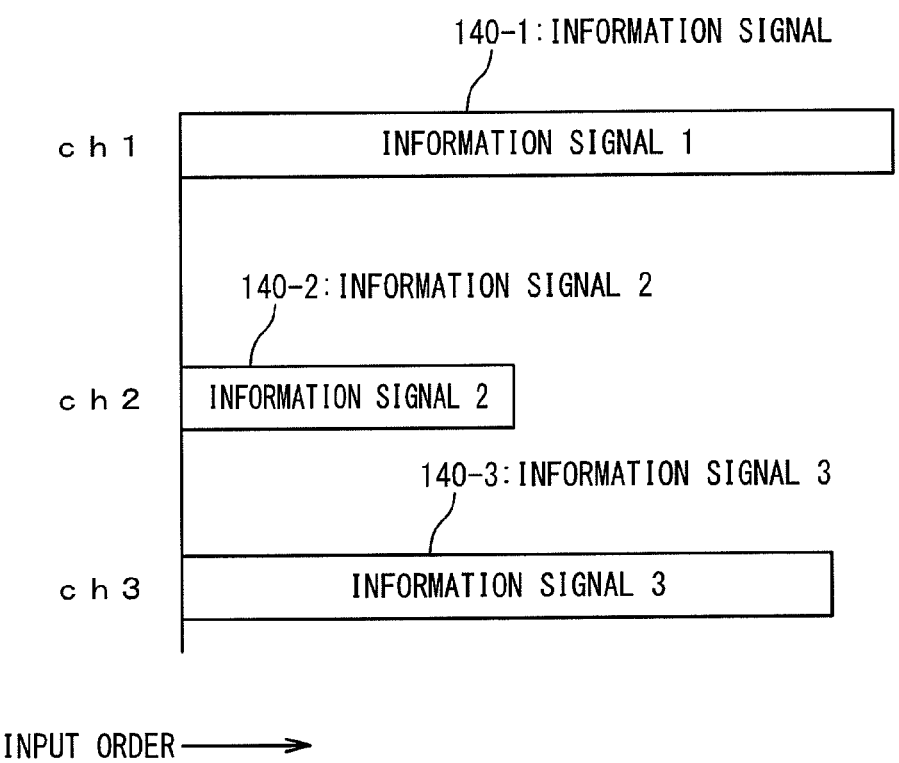

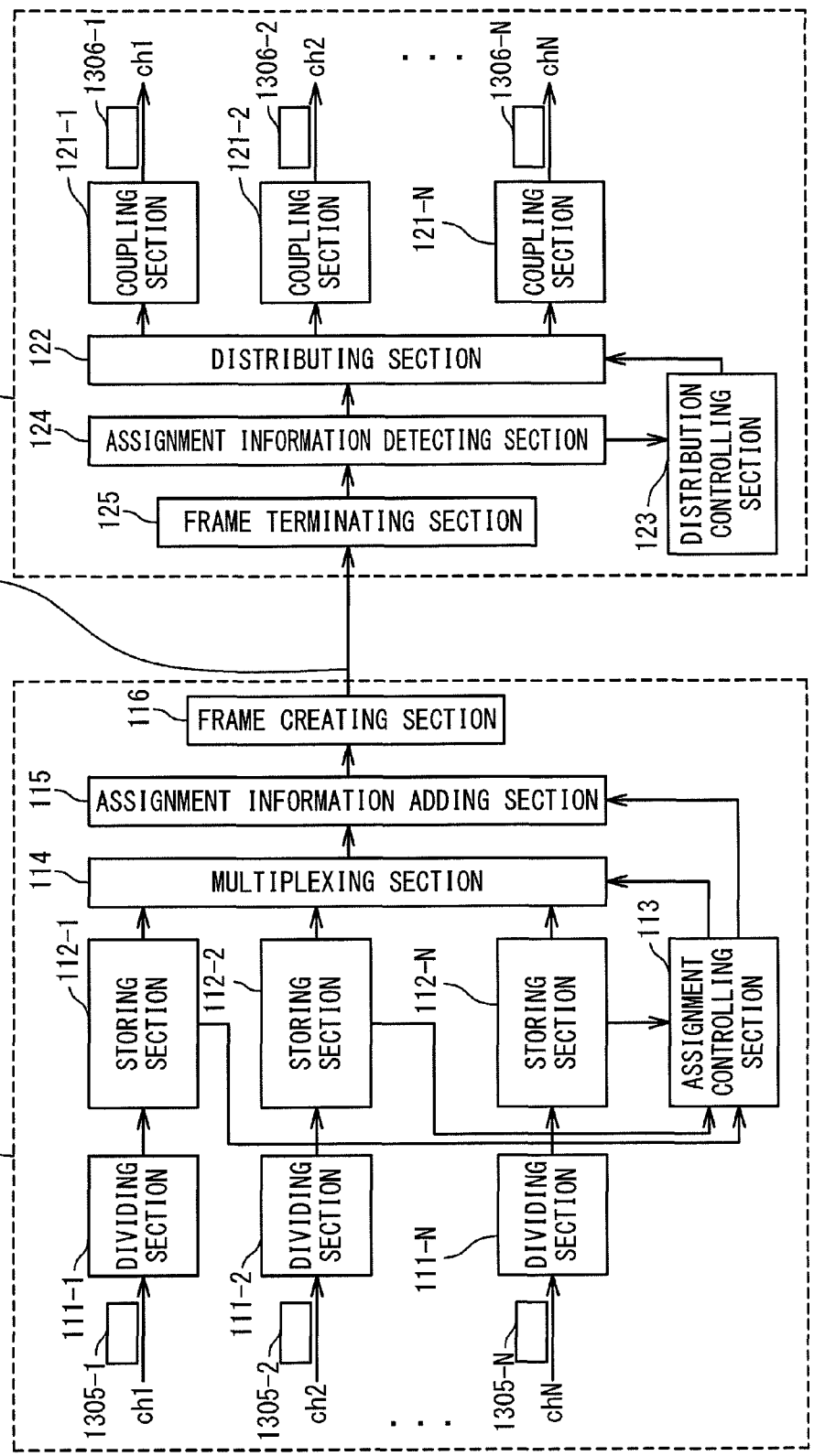

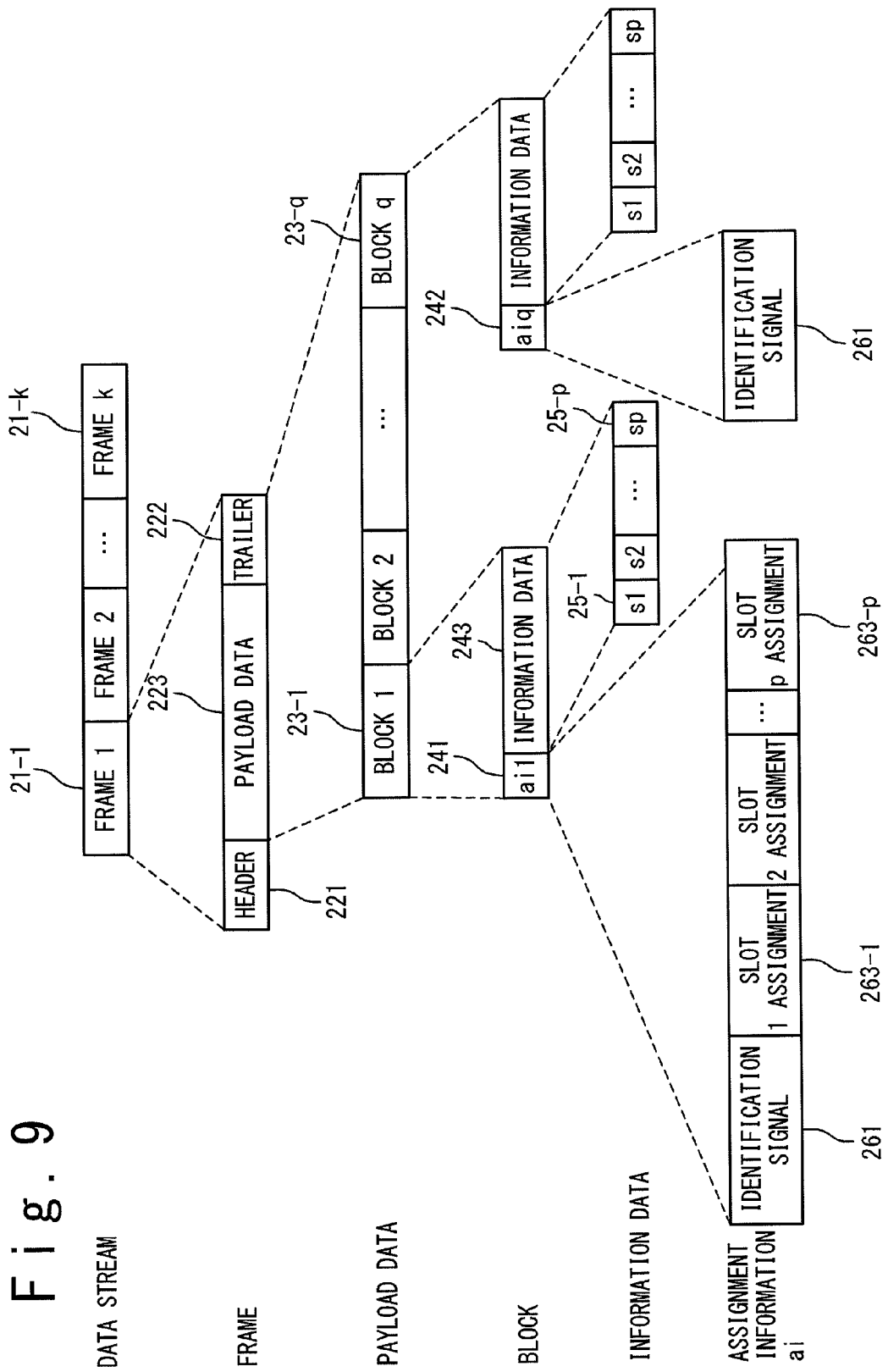

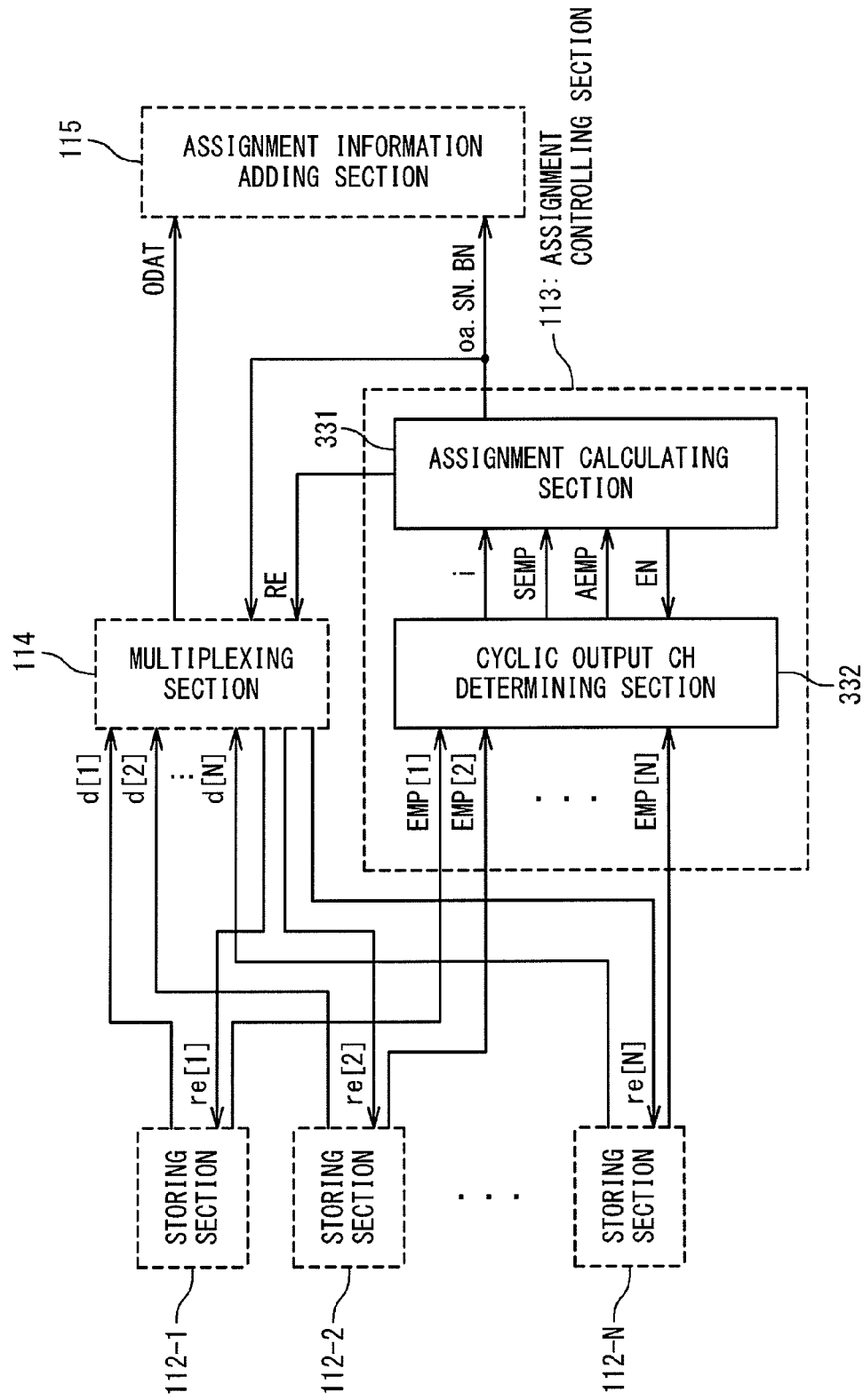

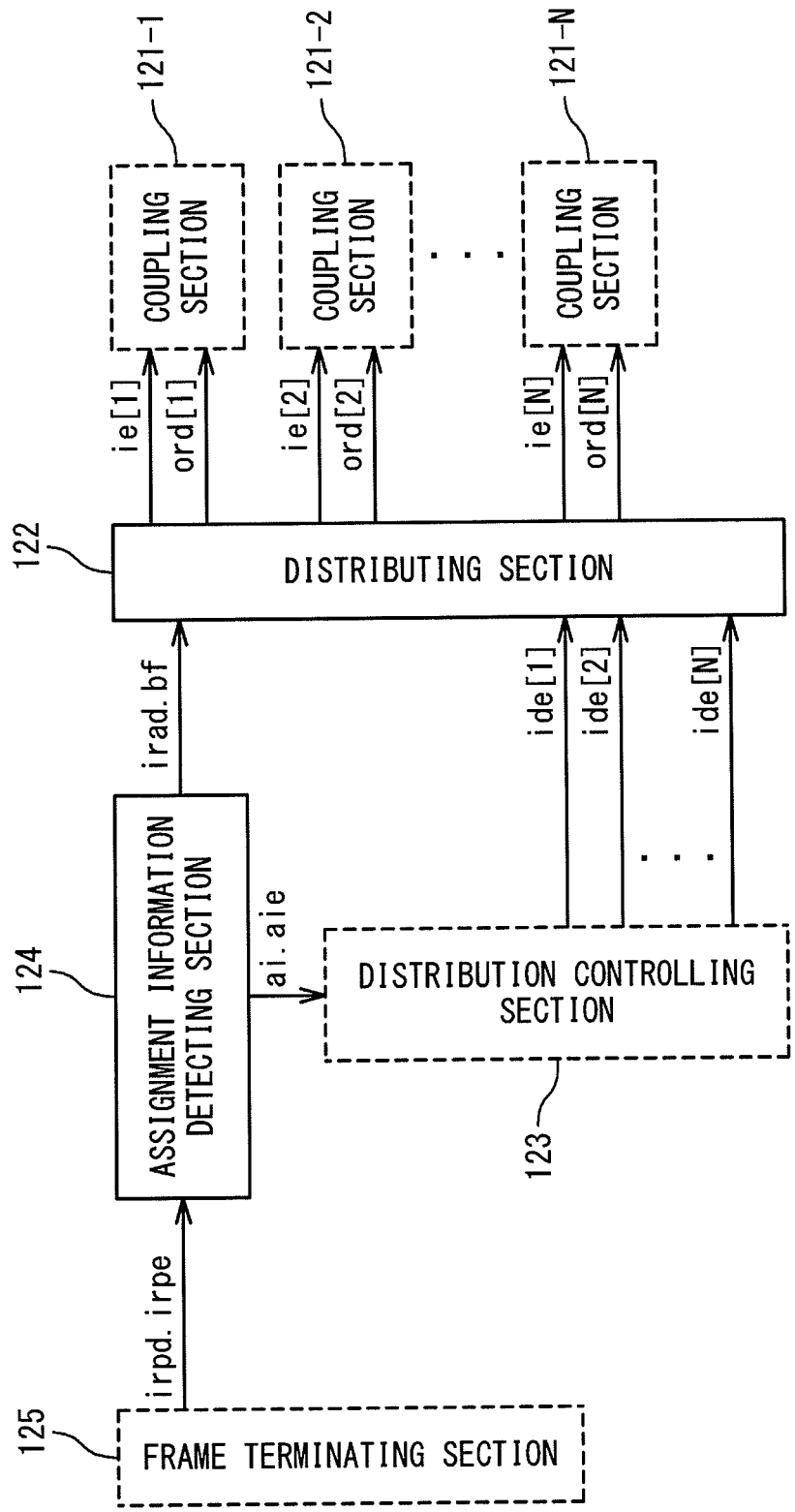

Fig. 15

| TIME | T1 | T2 | T3 | T4 | T5 | T6 | T7 | T8 | T9 | T10 | T11 | T12 | T13 | T14 | T15 |
|---|---|---|---|---|---|---|---|---|---|---|---|---|---|---|---|
| BLOCK NUMBER BN | BLOCK 1 | | | BLOCK 2 | | | BLOCK 3 | | | BLOCK 4 | | | BLOCK 5 | | |
| SLOT NUMBER SN | s1 | s2 | s3 | s1 | s2 | s3 | s1 | s2 | s3 | s1 | s2 | s3 | s1 | s2 | s3 |
| SLOT ASSIGNMENT oa | 1 | 2 | 3 | 1 | 2 | 3 | 1 | 2 | 3 | 1 | 2 | 3 | 1 | 2 | 3 |
| INFORMATION DATA ODAT | d1-1 | d2-1 | d3-1 | d1-2 | d2-2 | d3-2 | d1-3 | d2-3 | d3-3 | d1-4 | d3-4 | d3-5 | d1-6 | d3-6 | |
| BLOCK NUMBER BN' | | | | BLOCK 1 | | | BLOCK 2 | | | BLOCK 3 | | | BLOCK 4 | | |
| INFORMATION DATA ODAT' | | | | d1-1 | d2-1 | d3-1 | d1-2 | d2-2 | d3-2 | d1-3 | d2-3 | d3-3 | d1-4 | d3-4 | d1-5 |
| ASSIGNMENT INFORMATION ai | ai1 6-1 | | | ai'2 6-2 | | | ai'3 6-3 | | | ai4 6-4 | | | | | |

Fig. 17

| | IDENTIFICATION SIGNAL | IDENTIFICATION SIGNAL | SLOT 1 ASSIGNMENT | SLOT 2 ASSIGNMENT | SLOT 3 ASSIGNMENT |
|---|---|---|---|---|---|
| | id(1'b0) | id(1'b1) | ch No (2bit) | ch No (2bit) | ch No (2bit) |
| DIFFERENCE | | | | | |
| NO DIFFERENCE | | | | | |
| EXAMPLE OF BLOCK 1  ai1 = 6-1 | 0 | | 0  1 ch1 | 1  0 ch2 | 1  1 ch3 |
| EXAMPLE OF BLOCK 2  ai'2 = 6-2 | | 1 | DIFFERENCE | NO DIFFERENCE | DIFFERENCE |
| EXAMPLE OF BLOCK 4  ai4 = 6-4 | 0 | | 0  1 ch1 | 1  1 ch3 | 0  1 ch1 |

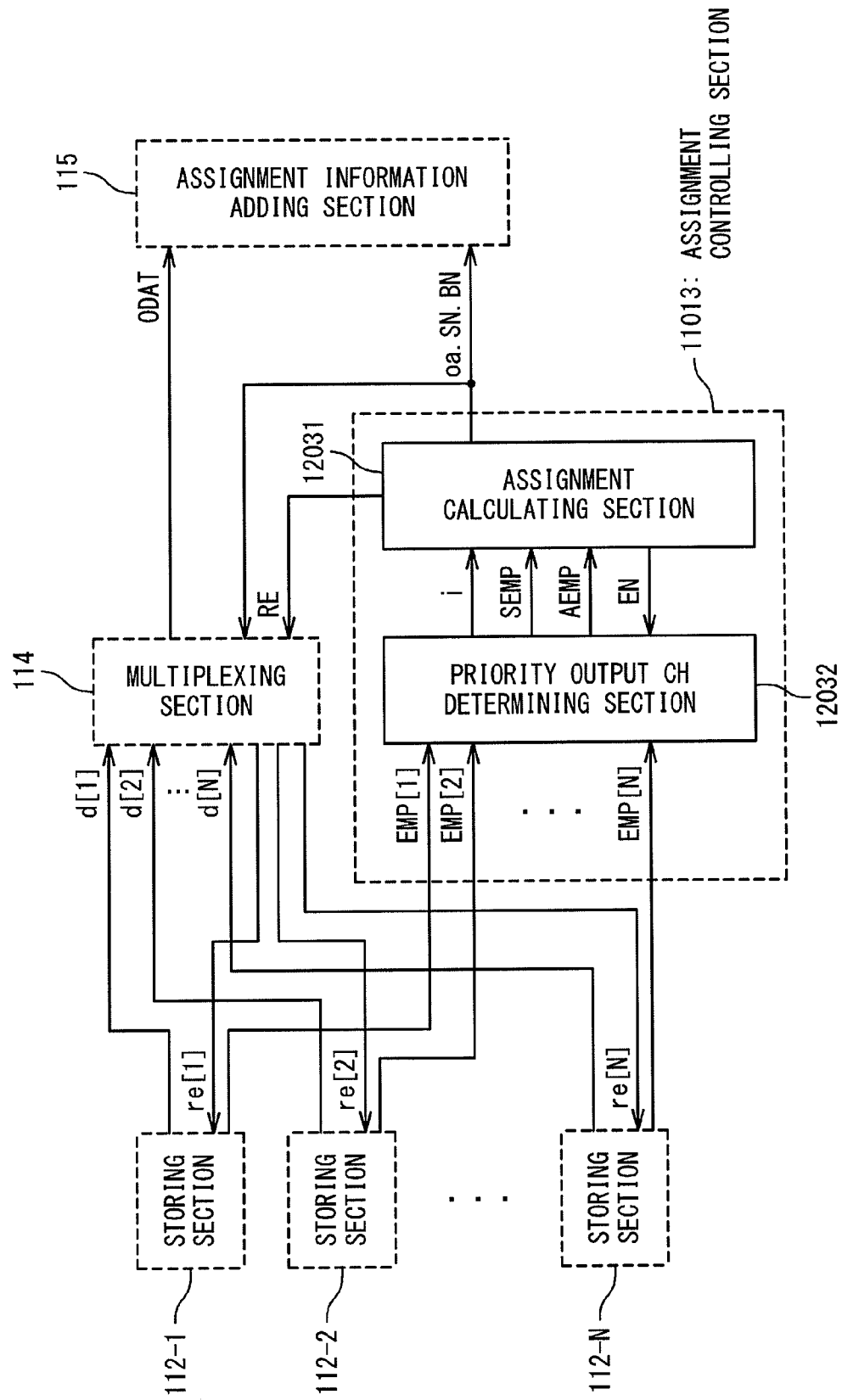

MULTIPLEXING TRANSMISSION SYSTEM, MULTIPLEXING APPARATUS, DEMULTIPLEXING APPARATUS AND A MULTIPLEXING TRANSMISSION SYSTEM

CROSS REFERENCE TO RELATED APPLICATIONS

This application is a National Stage of International Application No. PCT/JP2010/055332 filed on Mar. 26, 2010, which claims priority from Japanese Patent Application No. 2009-077717, filed on Mar. 26, 2009, the contents of all of which are incorporated herein by reference in their entirety.

TECHNICAL FIELD

The present invention relates to a multiplexing transmission system.

BACKGROUND ART

A multiplexing transmission system is a system which assigns input signals supplied from a plurality of transmission channels to different times, different wave lengths (frequencies) or the like, respectively, to transmit them via a single transmission channel. As a multiplexing transmission method of a variable length frame (for example, Ethernet (registered trademark) frame (hereinafter referred to as a MAC (Media Access Control) frame)), a frame multiplexing transmission method is known, which multiplexes each frame of a plurality of variable length frames to transmit them.

The frame multiplexing transmission method will be described with reference to FIG. 1. FIG. 1 is a schematic view showing a frame multiplexing transmission system which executes a frame multiplexing transmission method. The frame multiplexing transmission system includes a multiplexing apparatus 131 and a demultiplexing apparatus 132. The multiplexing apparatus 131 and the demultiplexing apparatus 132 are connected to each other via a transmission channel 134. Each of the multiplexing apparatus 131 and the demultiplexing apparatus 132 has channels (each of which is hereinafter also referred to as a ch) 1 to N (N is an arbitrary integer equal to or more than 1). The multiplexing apparatus 131 supplies variable length frames (hereinafter referred to as information signals) 130-1 130-N as input signals to the ch1 to chN. The multiplexing apparatus 131 multiplexes the information signals 130-1 to 130-N to create a multiplexing signal 135. The multiplexing apparatus 131 transmits the multiplexing signal 135 to the transmission channel 134. In FIG. 1, the transmission channel 134 indicates an occupation state of a transmission band in each ch in the multiplexing signal 135. The demultiplexing apparatus 132 receives the multiplexing signal 135 from the transmission channel 134. The demultiplexing apparatus 132 demultiplexes the multiplexing signal 135 to output information signals 136-1 to 136-N as output signals from the ch1 to chN, respectively.

Here, for example, let us suppose that a non-signal state 133-1 arises in the input signal of the ch2. In this case, an empty band 135-1 arises in the multiplexing signal 135-1. The multiplexing apparatus 131 effectively uses the transmission band of the transmission channel 134 by applying the empty band 135-1 to transmission of information signal of another channel. In the example of FIG. 1, the multiplexing apparatus 131 transmits the information signal of the ch1 by using the empty band 135-1.

The frame multiplexing transmission method multiplexes variable length information signal directly. FIGS. 2A to 2C are views describing a frame multiplexing in the frame multiplexing transmission method. In FIGS. 2A to 2C, A1 to A2, B1 and C1 to C4 indicate frame data, respectively. FIG. 2A indicates frame data on which frame multiplexing has not carried out yet. FIG. 2B indicates frame data on which frame multiplexing has carried out. FIG. 2C indicates frame data on which frame demultiplexing has carried out. Here, in FIGS. 2A to 2C, the A1 to A2 correspond to the information signal 130-1, the B1 corresponds to the information signal 130-2 and the C1 to C4 correspond to the information signal 130-N. In the frame multiplexing transmission method, when an information signal supplied from one specific channel is long, until the information signal is completely transmitted, an information signal supplied from another channel cannot be transmitted. Therefore, the problem arises in which the transmission state of the information signal in the specific channel causes a negative effect on the transmission state of the information signal in the other channel. In FIGS. 2A to 2C, since the frame length of the frame A1 supplied from the ch1 is long, the frame B1 and the frames C1 to C4 supplied from the ch2 and the chN, respectively, are delayed as shown in FIG. 2C.

Such a problem appears particularly in the case that an information signal including data with a high real time property and an information signal including data with a low real time property are multiplexed and transmitted as the effect on the information signal including the data with the high real time property. For example, let us suppose that information signals are transmitted, the information signals including data, which have low real time properties and have large data sizes, such as image data of the CAD (computer aided design) and/or data of file transmission. In addition, let us suppose that other information signals are supplied at that time, the other information signals including data, which have high real time properties, such as voice data of VoIP (Voice over IP (Internet Protocol)) and/or video data of video delivery. In this case, until the data of the CAD and/or the file transmission is completely transmitted, the data of the VoIP and/or the video delivery cannot be transmitted. Therefore, the real time property of the VoIP and/or the video delivery cannot be secured.

In order to solve the above-mentioned problem, a technique is disclosed, which divides a variable length frame of an information signal supplied to each channel into fixed length data, each of which has a small size, and assigns it to a payload of a multiplexing frame in a multiplexing signal.

The patent literature 1 discloses a broadcast transmitting device which can perform effective transmission. The broadcast transmitting device in the patent literature 1 includes a setting means, a creating means and a transmitting means. The setting means sets an assignment of information communication channels to slots provided to a frame. The creating means creates, based on the setting contents by the setting means, a frame in which broadcast-related information regarding the information communication channel assigned to each slot are contained in each slot and information identifying the information communication channel is added to the broadcast-related information regarding the information communication channel. The transmitting means transmits the frame created by the creating means. The broadcast transmitting device in the patent literature 1 can arbitrarily set an assignment of information communication channels to slots provided to a frame which transmits signals concerning broadcasting. Thus, the broadcast transmitting device in the patent literature 1 can perform effective transmission according to the various usage statuses of the information communication channels.

Hereinafter, the broadcast transmitting device in the patent literature 1 will be described with reference to drawings. FIG. 3 is a view showing a configuration of a transmission system according the broadcast transmitting device in the patent literature 1. The transmission system includes a transmitting device 141 and a receiving device 142. The transmitting device 141 and the receiving device 142 are connected to each other by using a transmission channel 144. Here, in the patent literature 1, the transmitting device 141 and the receiving device 142 perform wireless transmission.

First, a configuration of the transmitting device 141 will be described. The transmitting device 141 includes a multiplexing processing section 1411, a modulating section 1412, a transmitting section 1413, an operating section 1414, a controlling section 1415 and encoding sections 1416-1 to 1416-N. The transmitting device 141 receives information signals 140-1 to 140-N of N number of channels as input signals. The encoding sections 1416-1 to 1416-N encode the information signals 140-1 to 140-N, respectively, and output them to the multiplexing processing section 1411. The multiplexing processing section 1411 multiplexes the encoded information signals 140-1 to 140-N to create a data stream (a multiplexing signal) and outputs it to the modulating section 1412. The modulating section 1412 modulates the data stream and outputs it to the transmitting section 1413. The transmitting section 1413 performs a transmitting processing on the modulated data stream and outputs it to the transmission channel 144. The operating section 1414 is an I/O interface between the device and the user. The controlling section 1415 controls the multiplexing processing section 1411 based on inputs from the operating section 1414.

Next, a configuration of a data stream transmitted and received between the transmitting device 141 and the receiving device 142 will be described. FIG. 4 is a view showing a configuration of a data stream transmitted by the broadcast transmitting device in the patent literature 1. The data stream includes successive frames each having the same configuration as others. Each frame includes a frame synchronous signal (hereinafter referred to as UW: unique word) 15021 and information data 15022. The information data 15022 of each frame includes fixed slots of the time-division. In this case, the number of channels: N is 3, and the number of slots of the information data 15022: p (p is an integer equal to or more than 1) is 3. Each slot of the information data includes channel information 15031 and a fixed length data 15032. The channel information 15031 is an identifier of the channel to which the base information signal of the fixed length data 15032 is supplied in the transmitting device 141. The fixed length data 15032 is data that the information signal supplied to the channel indicated by the channel information 15031 is divided into with fixed slot length. The data stream transmitted by the broadcast transmitting device in the patent literature 1 has the above-mentioned configuration.

Next, the creating the above-mentioned fixed length data 15032 to be stored in each slot of the frame in the data stream will be described. FIGS. 5A and 5B are views showing the division of the information signals 140-1 to 140-N into the fixed length data 15032 in the broadcast transmitting device in the patent literature 1. For example, let us suppose that the transmitting device 141 includes 3 channels and 3 encoding sections 1416-1 to 1416-3 corresponding to the respective channels. FIG. 5A indicates the information signals 140-1 to 140-3 supplied to respective channels by the transmitting device 141. The transmitting device 141 supplies the information signal 140-1 to the channel 1, the information signal 140-2 to the channel 2 and the information signal 140-3 to the channel 3. Since the information signals 140-1 to 140-3 are variable length frames, they have the different frame lengths.

Next, as shown in FIG. 5B, the information signals 140-1 to 140-3 are divided into fixed length data 161-1 to 161-*r*, 162-1 to 162-*r* and 163-1 to 163-*r* (r is an integer, r>0), respectively. The encoding sections 1416-1 to 1416-3 divide the information signals 140-1 to 140-3 into data with the same sizes as the fixed length data 15032, respectively, to create the fixed length data 161-1 to 161-*r*, 162-1 to 162-*r* and 163-1 to 163-*r*. These fixed length data 161-1 to 161-*r*, 162-1 to 162-*r* and 163-1 to 163-*r* are the fixed length data 15032. As described above, the fixed length data 15032 are created from the information signals 140-1 to 140-3.

Next, the multiplexing processing in the multiplexing processing section 1411 will be described. The multiplexing processing section 1411 multiplexes the fixed length data 15032 supplied from the encoding sections 1416-1 to 1416-3 by assigning the fixed length data 15032 to respective slots in the frames in the data stream. The multiplexing processing section 1411 assigns the fixed length data 15032 to the respective slots based on the assignment condition specified from the controlling section 1415. For example, let us suppose that the multiplexing processing section 1411 receives the assignment condition from the controlling section 1415.

<Assignment condition 1>: All channels have information signals.

Slot 1=ch1, Slot 2=ch2, Slot 3=ch 3

<Assignment condition 2>: The ch 2 does not have information signal and the other channels have information signals.

Slot 1=ch1, Slot 2=ch1, Slot 3=ch 3

FIG. 6 is a view showing the assignment status of the fixed length data to the respective slots by the multiplexing processing section 1411 in the broadcast transmitting device in the patent literature 1. The multiplexing processing section 1411 adds UWs 15021 to the information data 15022-1 to 15022-6, respectively, and output them to the modulating section 1412, in this order. The channel information 15031 and the fixed length data 15032 are stored in each slot of each of the information data 15022-1 to 15022-6. The multiplexing processing section 1411, during the information data 15022-1 to 15022-3 in which all channels have information signals, the slot 1 is assigned to the ch1, the slot 2 is assigned to the ch 2 and the slot 3 is assigned to ch3 based on the above-mentioned assignment condition 1. On the other hand, the multiplexing processing section 1411, during the information data 15022-4 or later in which the ch 2 does not have information signal and the other channels have information signals, the slot 1 is assigned to the ch1, the slot 2 is assigned to the ch 1 and the slot 3 is assigned to ch3 based on the above-mentioned assignment condition 2. The multiplexing processing section 1411 transmits the data stream multiplexed as mentioned above through the modulating section 1412 and the transmitting section 1413 to the transmission channel 144.

Next, with reference to FIG. 3, a configuration of the receiving device 142 will be described. The receiving device 142 includes a receiving section 1421, a demodulating section 1422, a demultiplexing section 1423 and decoding sections 1424-1 to 1424-N. The receiving section 1421 receives the data stream from the transmission channel 144. The receiving section 1421 performs a receiving processing on the data stream and outputs it to the demodulating section 1422. The demodulating section 1422 demodulates the data stream supplied from the receiving section 1421 and outputs it to the demultiplexing section 1423. The demultiplexing section 1423 identifies each frame by using frame synchronization based on the UW15021. The demultiplexing section 1423 demultiplexes the fixed length data 15032 from the slot of each frame. The demultiplexing section 1423 outputs the fixed length data 15032 to the corresponding decoding sections 1424-1 to 1421-N based on the channel information 15031. The decoding sections 1424-1 to 1424-N decode the fixed length data 15032 to reproduce the information signals 146-1 to 146-N. The decoding sections 1424-1 to 1424-N output the information signals 146-1 to 146-N to the channels 1 to N, respectively.

As shown above, in the broadcast transmitting device in the patent literature 1, the multiplexing processing section 1411, even if a certain channel does not have an information signal, assigns an information signal of another channel based on an assignment condition previously supplied from the controlling section 1415. Therefore, the broadcast transmitting device in the patent literature 1 can perform effective transmission by effectively using an empty band of a multiplexing signal.

As a related technique, the patent literature 2 discloses a preferential transmission system which can preferentially transmit (high priority) data with high importance during low-priority-data transmission.

In addition, the patent literature 3 discloses a method of controlling data transfer of a switching device which can perform data transfer with an arbitrary rate in an arbitrary channel in a data transfer with the time-division multiplexing mode.

Furthermore, the patent literature 4 discloses an ATM communication method which can improve a transmission efficiency of a downlink in a down link communication from a base station to a terminal station.

The first problem of the patent literature 1 is that if the number of slots: p in the information data 15022 is not equal to the number of channels: N in the transmitting device 141, the band assignment with an arbitrary ratio with respect to the channels cannot be carried out.

This is because the assignment condition set to the multiplexing processing section 1411 from the controlling section 1415 is static with respect to the slot. For example, let us suppose that the number of slots: p is 4 and the number of channels: N is 3. FIG. 7 is a view showing the assignment status of the fixed length data to the respective slots by the multiplexing processing section 1411 in the broadcast transmitting device in the patent literature 1. Each slot of the information data 15022-10 to 15022-12 includes the channel information 15031 and the fixed length data 15032. Here, let us suppose that the assignment condition, for which all channels have the fixed length data 15032, is the slot 1=the ch1, the slot 2=the ch1, the slot 3=the ch2 and the slot 4=the ch3. As shown in FIG. 7, the multiplexing processing section 1411 can perform the assignment of the fixed length data 15032 to the information data 15022-10 to 15022-12 based on the assignment condition. In this case, a channel multiplexing ratio of ch1:ch2:ch3 is 2:1:1. However, when the channel multiplexing ratio of ch1:ch2:ch3=1:1:1 is desired, it can be realized only by not using any one of the slots 1 to 4. In addition, when the channel multiplexing ratio of ch1:ch2:ch3=3:2:1 is desired, it cannot be realized because the number of slots is less than 6 which is the necessary number of slots.

The second problem is that if a certain channel does not have an information signal and another channel has an information signal, the information signal cannot be assigned to an empty band with an arbitrary ratio with respect to the channels.

This is because the assignment condition, for which a certain channel does not have an information signal, set to the multiplexing processing section 1411 is static with respect to the slot. For example, let us suppose that the number of slots: p is 3 and the number of channels: N is 3 and the multiplexing processing section 1411 sets the above-mentioned assignment conditions 1 and 2, as described with reference to FIG. 6. The information data 15022-1 to 15022-3 depend on the assignment condition 1 and the multiplexing ratio of ch1:ch2:ch3 is 1:1:1. On the other hand, the information data 15022-4 to 15022-7 depend on the assignment condition 2 and the multiplexing ratio of ch1:ch2:ch3 is 2:0:1. In this case, when the ratio of ch1:ch3 is tried to be 1:1, it can be realized only by not using the slot used by the ch2. Therefore, the transmission efficiency is decreased.

The third problem is that a band loss arises because a transmission band for adding the channel information 15031 to each fixed length data 15032 is required.

This is because the channel including the fixed length data 15032 stored in each slot of the information data 15022 is different based on whether or not the fixed length data 15032 exists in each channel of the transmitting device 141. Therefore, in order to demultiplexing the data stream appropriately on the side of the receiving device 142, the channel information 15031 has to be added to the fixed length data 15032. As a result, in the transmission of the data stream, the band for the channel information 15031 is inevitably consumed.

CITATION LIST

Patent Literature

[PTL 1] Japanese patent publication JP-P2008-118344A
[PTL 2] Japanese patent publication JP-P2007-235614A
[PTL 3] Japanese patent publication JP-A-Heisei 5-091081
[PTL 4] Japanese patent publication JP-A-Heisei 11-163884

SUMMARY OF INVENTION

An object of the present invention is to provide a multiplexing transmission system which can maintain a multiplexing ratio among channels which have information signals to be transmitted so as to be capable of performing an effective multiplexing transmission even if the number of slots and the number of channels are not the same or even if a certain channel does not have an information signal and consequently an empty band arises, in order to solve the above-mentioned problem.

A multiplexing transmission system of the present invention includes a multiplexing apparatus and a demultiplexing apparatus. The multiplexing apparatus includes a dividing section, a storing section, an assignment controlling section, a multiplexing section, an assignment information adding section and a frame creating section. The dividing section divides information signals supplied from a plurality of channels to create fixed length data each having a predetermined fixed length. The storing section relates the fixed length data to the plurality of channels and stores the fixed length data. The assignment controlling section stores a channel multiplexing ratio number indicating a ratio of the fixed length data stored in a payload of a multiplexing frame among the plurality of channels, selects each channel cyclically to determines an output channel, and outputs an assignment instruction for acquiring the fixed length data based on the channel multiplexing ratio number of the output channel. The multiplexing section acquires the fixed length data from the storing section every time receiving the assignment instruction to store the fixed length data in the payload in turn. The assignment information adding section adds assignment information to the payload, the assignment information including a channel arrangement of each channel of the fixed length data stored in the payload. The frame creating section creates the multiplexing frame from the payload to transmit the multiplexing frame to a transmission channel. In addition, the demultiplexing apparatus includes a frame terminating section, an assignment information detecting section, a distributing section and a coupling section. The frame terminating section receives the multiplexing frame from the transmission channel. The assignment information detecting section detects the assignment information from the payload of the multiplexing frame to create distribution information for distributing the fixed length data to the each channel based on the assignment information. The distributing section detects the fixed length data from the payload to distribute the fixed length data to the each channel based on the distribution information. The coupling section couples the fixed length data to reproduce the information signal.

A multiplexing apparatus of the present invention is used for the above-mentioned multiplexing transmission system. A demultiplexing apparatus of the present invention is used for the above-mentioned multiplexing transmission system.

A multiplexing transmission method of the present invention includes: in a multiplexing transmission system including a multiplexing apparatus and a demultiplexing apparatus, dividing information signals supplied from a plurality of channels to create fixed length data each having a predetermined fixed length; relating the fixed length data to the plurality of channels and storing the fixed length data; storing a channel multiplexing ratio number indicating a ratio of the fixed length data stored in a payload of a multiplexing frame among the plurality of channels; selecting each channel cyclically to determines an output channel; outputting an assignment instruction for acquiring the fixed length data based on the channel multiplexing ratio number of the output channel; acquiring the fixed length data from the storing section every time receiving the assignment instruction to store the fixed length data in the payload in turn; adding assignment information to the payload, the assignment information including a channel arrangement of each channel of the fixed length data stored in the payload; and creating the multiplexing frame from the payload to transmit the multiplexing frame to a transmission channel. In addition, the method includes: receiving the multiplexing frame from the transmission channel; detecting the assignment information from the payload of the multiplexing frame to create distribution information for distributing the fixed length data to the each channel based on the assignment information; detecting the fixed length data from the payload to distribute the fixed length data to the each channel based on the distribution information; and coupling the fixed length data to reproduce the information signal.

According to the present invention, a multiplexing transmission system can be provided, which can maintain a multiplexing ratio among channels which have information signals to be transmitted so as to be capable of performing an effective multiplexing transmission even if the number of slots and the number of channels are not the same or even if a certain channel does not have an information signal and consequently an empty band arises.

BRIEF DESCRIPTION OF DRAWINGS

The above and other objects, advantages and features of the present invention will be more apparent from the following description of certain preferred exemplary embodiments taken in conjunction with the accompanying drawings, in which:

FIG. 1 is a schematic view showing a frame multiplexing transmission system which executes a frame multiplexing transmission method;

FIG. 3 is a view showing a configuration of a transmission system according the broadcast transmitting device in the patent literature 1;

FIG. 5A is a view showing the division of the information signals into the fixed length data in the broadcast transmitting device in the patent literature 1;

FIG. 8 is a functional block diagram showing a configuration of a multiplexing transmission system according to a first exemplary embodiment;

FIG. 9 is a view showing a frame configuration of a data stream transmitted by the multiplexing transmission system according to a first exemplary embodiment;

FIG. 11 is a view showing a configuration of an assignment controlling section 113 and a flow of signals in a multiplexing apparatus 1301 according to the first exemplary embodiment;

FIG. 12 is a view showing a flow of signals in a demultiplexing apparatus 1302 according to the first exemplary embodiment;

FIG. 15 is a timing chart showing an operation of an assignment information adding section 115 according to the first exemplary embodiment;

FIG. 17 is a view showing a format of assignment information ai according to the first exemplary embodiment;

FIG. 21 is a view showing a configuration of an assignment controlling section 11013 and a flow of signals in an egress 1101 according to the second exemplary embodiment.

DESCRIPTION OF EXEMPLARY EMBODIMENTS

Figure 2A:
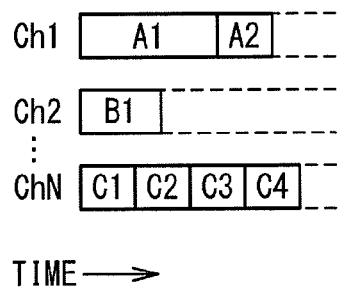
FIG. 2A is a view describing a frame multiplexing in the frame multiplexing transmission method.
Figure 2B:
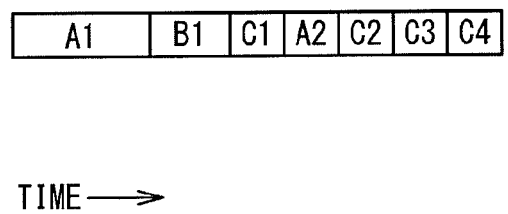
FIG. 2B is a view describing the frame multiplexing in the frame multiplexing transmission method.
Figure 2C:
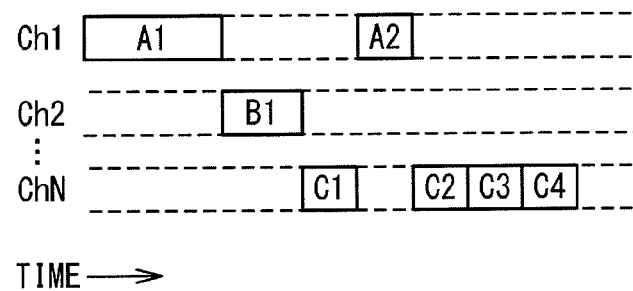
FIG. 2C is a view describing the frame multiplexing in the frame multiplexing transmission method.

Exemplary embodiments of a multiplexing transmission system of the present invention will be described below referring to the accompanying drawings.

First Exemplary Embodiment

The multiplexing transmission system according to the first exemplary embodiment of the present invention will be described.
[Configuration]
First, a configuration of the multiplexing transmission system according to the present exemplary embodiment will be described.
1. System Configuration
A system configuration of the multiplexing transmission system according to the present exemplary embodiment will be described. FIG. 8 is a functional block diagram showing a configuration of the multiplexing transmission system according to the first exemplary embodiment. The multiplexing transmission system according to the present exemplary embodiment includes a multiplexing apparatus 1301 and a demultiplexing apparatus 1302. The multiplexing apparatus 1301 and the demultiplexing apparatus 1302 are connected via a transmission channel 1304. Here, in the present exemplary embodiment, it is supposed that the transmission channel 1304 is a wired transmission channel. However, the transmission channel 1304 may be a wireless transmission channel. In this case, the multiplexing apparatus 1301 and the demultiplexing apparatus 1302 include configurations for performing a wireless communication. Since the fact whether the transmission channel is wired or wireless is not essential for the present invention and the conventional technique can be used, its detailed description is omitted.

The multiplexing apparatus 1301 and the demultiplexing apparatus 1302 includes channels (hereinafter also referred to as ch) 1 to N. The multiplexing apparatus 1301 is supplied with variable length frames (hereinafter referred to as information signals) 1305-1 to 1305-N as input signals from respective channels. The multiplexing apparatus 1301 divides the information signals 1305-1 to 1305-N supplied from the respective channels into fixed length data each having a fixed length. The multiplexing apparatus 1301 multiplexes the fixed length data to create a data stream (a multiplexing signal) based on a predetermined multiplexing ratio. Here, the multiplexing apparatus 1301 adds information indicating which of the channels each fixed length data corresponds to. The multiplexing apparatus 1301 transmits the created data stream to the transmission channel 1304. Here, the present exemplary embodiment is described supposing that the information signals 1305-1 to 1305-N in the present exemplary embodiment are MAC frames of Ethernet (registered trademark). That is, the information signals 1305-1 to 1305-N are variable length frames each having finite length. The demultiplexing apparatus 1302 receives the data stream from the transmission channel 1304. The demultiplexing apparatus 1302 demultiplexes the fixed length data from the data stream and outputs the information signals 1306-1 to 1306-N from channels corresponding to the information signals, respectively, as output signals.

Incidentally, at the previous stage of the channels 1 to N of the multiplexing apparatus 1301 and the subsequent stage of the channels 1 to N of the demultiplexing apparatus 1302, a MAC (Media Access Control) section, a PCS (Physical Coding Sublayer) section and a transmitting/receiving section are connected, even though they are omitted in FIG. 8. In addition, the transmitting/receiving section is connected to a network device such as a rooter, a network switch and the like, a server, a personal computer and the like a via wired or wireless transmission channel. The multiplexing apparatus 1301 receives the information signals 1305-1, to 1305-N from these sections. The demultiplexing apparatus 1302 transmits the information signals 1306-1 to 1306-N to these sections. Since these sections are not essential for the present invention and the conventional technique can be used, their detailed descriptions are omitted.

These are the system configuration of the multiplexing transmission system according to the present exemplary embodiment.
2. Frame Configuration
Next, a frame configuration of the data stream transmitted by the multiplexing transmission system according to the present exemplary embodiment will be described. FIG. 9 is a view showing the frame configuration of the data stream transmitted by the multiplexing transmission system according to the present exemplary embodiment.

The data stream includes frames 21-1 to 21-$k$ ($k$ is an integer, equal to or more than 1). Hereinafter, the expression of the "frame 21" means an arbitrary frame in the frames 21-1 to 21-$k$. A certain interval (IFG: Inter Frame Gap) may be provided between the adjacent two frames 21, even though it is not shown in FIG. 9. Respective frames 21 are frame-synchronized by the demultiplexing apparatus 1302.

Next, the frame includes a header 221, a trailer 222 and a payload data 223. In the header 221, destination information of the frame and identification information of the payload data 223 are set. In the trailer 222, an error-detecting code and an error-correcting code are set. In the payload data 223, the information signal is stored. Incidentally, the frames 21-1 to 21-$k$ have the same configuration.

Next, the payload data 223 includes block 23-1 to 23-$q$ ($q$ is an integer, equal to or more than 1). Hereinafter, the expression of the "block 23" means an arbitrary block in the blocks 23-1 to 23-$q$.

Next, the block 23 includes assignment information 241 or assignment information 242 and information data 243. The difference between the assignment information 241 and the assignment information 242 will be described later.

Next, the information data 243 includes slots 25-1 to 25-$p$. Hereinafter, the expression of the "slot 25" means an arbitrary slot in the slots 25-1 to 25-$p$. In the slots 25-1 to 25-$p$, the fixed length data, into which the information signals 1305-1 to 1305-N supplied to the channels 1 to N of the multiplexing apparatus 1301 are divided, are stored.

Figure 10A:
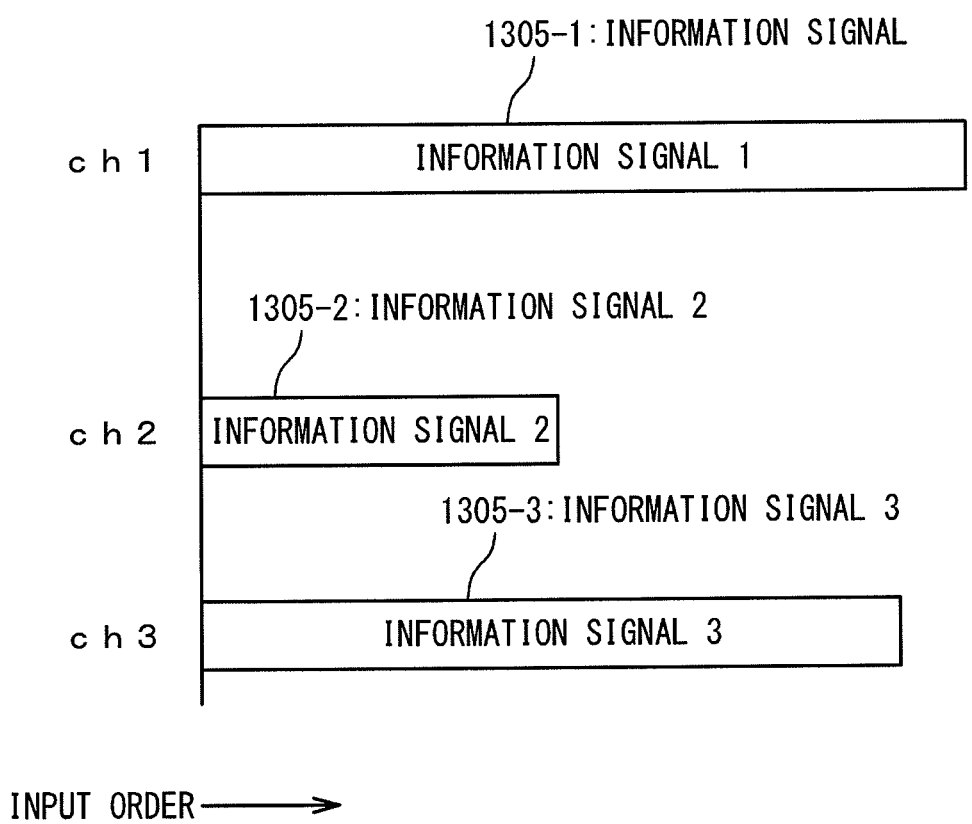
FIG. 10A is a view showing the division of information signals 1305-1 to 1305-N into fixed length data by a multiplexing apparatus 1301 according to the first exemplary embodiment.
Figure 10B:
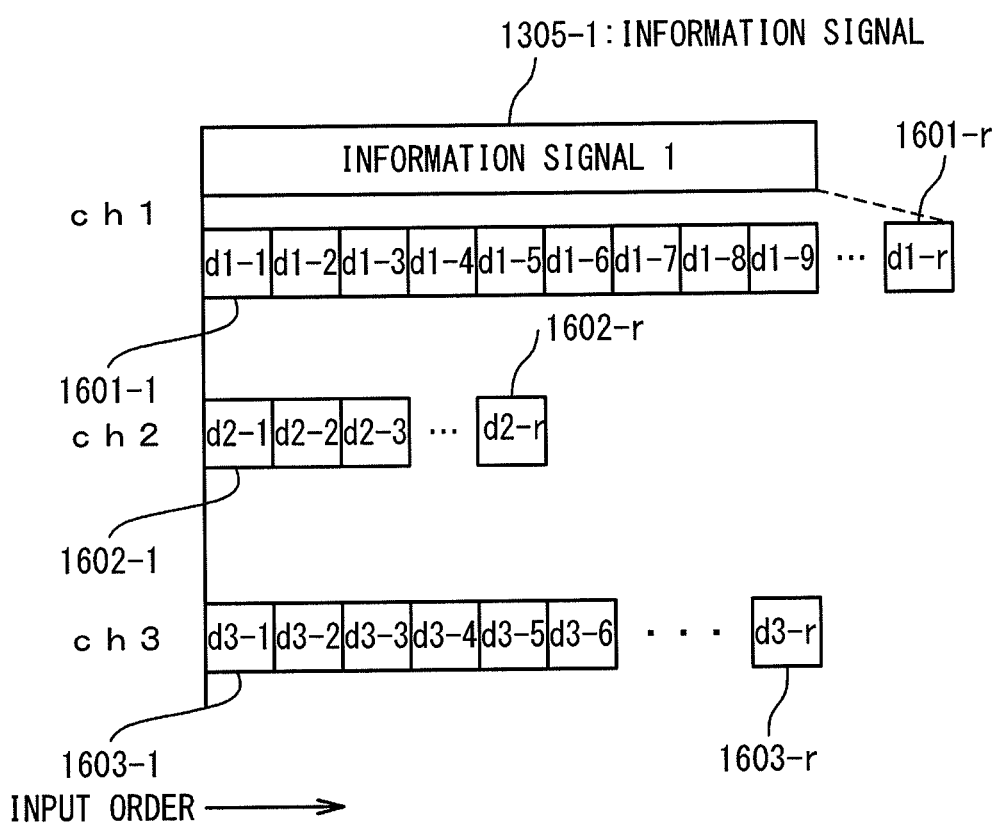
FIG. 10B is a view showing the division of the information signals 1305-1 to 1305-N into the fixed length data by the multiplexing apparatus 1301 according to the first exemplary embodiment.

Here, the division of the information signals 1305-1 to 1305-N into the fixed length data will be described. FIGS. 10A and 10B are views showing the division of the information signals 1305-1 to 1305-N into the fixed length data by the multiplexing apparatus 1301 according to the present exemplary embodiment. In this description, the division process for the information signals 1305-1 to 1305-3 will be described as an example. FIG. 10A indicates the information signal 1305-1 to 1305-3 which the multiplexing apparatus 1301 receives via the respective channels. As mentioned before, the information signal 1305-1 to 1305-3 are variable length frames and the frame lengths thereof are different from each other. FIG. 10B indicates the fixed length data which are created from the information signals 1305-1 to 1305-3 by the multiplexing apparatus 1301.

The multiplexing apparatus 1301 divides the information signal 1305-1 supplied to the ch1 into the fixed length data 1601-1 to 1602-*r* (r is an integer, more than j). The data size of each of the fixed length data 1601-1 to 1601-*r* is previously determined. Similarly, the multiplexing apparatus 1301 divides the information signal 1305-2 supplied to the ch2 into the fixed length data 1602-1 to 1602-*r*. The multiplexing apparatus 1301 divides the information signal 1305-3 supplied to the ch3 into the fixed length data 1603-1 to 1603-*r*. In addition, similarly, the information signals 1305-4 to 1305-N are also divided into the fixed length data, which are not shown here. Hereinafter, the expression of the "fixed length data 1600" means arbitrary fixed length data. The fixed length data 1600 created as mentioned above are stored in the slots 25-1 to 25-*p*.

Next, as shown in FIG. 9, the assignment information 241 includes identification information 261 and slot assignment 263-1 to 263-*p*. The identification information 261 indicates information for identifying the block 23. Each of the slot assignment 263-1 to 263-*p* indicates that which of the channels the fixed length data 1600 stored in the slots 25-1 to 25-*p* are supplied from. By using this, the demultiplexing apparatus 1302 can determine which of the channels the fixed length data 1600 stored in the slots 25-1 to 25-*p* correspond to. On the other hand, the assignment information 242 includes only identification information 261. That is, the assignment information 242 does not include the slot assignment 263-1 to 263-*p*. The difference between the assignment information 241 and the assignment information 242 is whether or not the slot assignment 263-1 to 263-*p* is included.

The assignment information 241 is added to the information data 243 when the channel assignment of the information data 243 to the slots 25-1 to 25-*p* is changed. This is because when the channel assignment of the information data 243 to the slots 25-1 to 25-*p* is changed, the demultiplexing apparatus 1302 cannot determine appropriate channels corresponding to the fixed length data included in the slots 25-1 to 25-*p* if the demultiplexing apparatus 1302 does not refer to the slot assignment 263-1 to 263-*p*.

On the other hand, the assignment information 242 is added to the information data 243 when the channel assignment of the information data 243 to the slots 25-1 to 25-*p* is not changed. This is because when the channel assignment of the information data 243 to the slots 25-1 to 25-*p* is not changed, the demultiplexing apparatus 1302 can perform the processing based on the channel assignment to the slots 25-1 to 25-*p* in the last block 23.

Because of these configurations, the amount of the data contained in the assignment information 241 is different from and the amount of the data contained in the assignment information 242. That is, the data length of the block 23 including the assignment information 241 is different from the data length of the block 23 including the assignment information 242.

These are the frame configuration of the data stream transmitted by the multiplexing transmission system according to the present exemplary embodiment.

3. Configuration of Multiplexing Apparatus 1301

Next, with reference to FIG. 8, the configuration of the multiplexing apparatus 1301 according to the present exemplary embodiment will be described. The multiplexing apparatus 1301 includes dividing sections 111-1 to 111-N, storing sections 112-1 to 112-N, an assignment controlling section 113, a multiplexing section 114, an assignment information adding section 115 and a frame creating section 116. The dividing sections 111-1 to 111-N are connected to previous stage processing sections (not shown) and the storing sections 112-1 to 112-N, respectively. The dividing sections 111-1 to 111-N correspond to the channel 1 to N, respectively, and receive the information signals 1305-1 to 1305-N from the previous stage processing sections of the corresponding channels. The dividing sections 111-1 to 111-N divide the information signals 1305-1 to 1305-N, respectively, by the encoding based on the 8B/10B conversion code or the 64B/66B conversion code to create the fixed length data 1600. The dividing sections 111-1 to 111-N are connected to the storing sections 112-1 to 112-N, respectively, in one-to-one correspondence. The dividing sections 111-1 to 111-N output the fixed length data 1600 to the storing sections 112-1 to 112-N, respectively.

Next, the storing sections 112-1 to 112-N are connected to the dividing sections 111-1 to 111-N, an assignment controlling section 113 and a multiplexing section 114, respectively. The storing sections 112-1 to 112-N receive the fixed length data 1600 from the dividing sections 111-1 to 111-N, respectively, and store the fixed length data 1600. Each of the storing sections 112-1 to 112-N outputs the number of the stored fixed length data 1600 (hereinafter referred to as the effective data number) to the assignment controlling section 113. In addition, when the storing sections 112-1 to 112-N receive a read command from the multiplexing section 114, the storing sections 112-1 to 112-N output the fixed length data 1600 to the multiplexing section 114 based on the read command.

Next, the assignment controlling section 113 is connected to the storing sections 112-1 to 112-N, the multiplexing section 114 and the assignment information adding section 115. The assignment controlling section 113 receives the effective data numbers from the storing sections 112-1 to 112-N. The assignment controlling section 113 determines the assignment of the channel of which the fixed length data 1600 to be stored in the slots 25 of each frame 21 of the data stream. The assignment controlling section 113 determines the assignment of the channel based on the effective data number of each channel and a predetermined multiplexing ratio of respective channels (hereinafter referred to as channel multiplexing ratio number). After determining the assignment of the channel, the assignment controlling section 113 outputs an assignment command to the multiplexing section 114. At the same time, the assignment controlling section 113 outputs slot assignment information to the assignment information adding section 115. The slot assignment information includes the slot assignment 263-1 to 263-*p*.

Here, the channel multiplexing ratio number is a value for determining the multiplexing ratio of the channels 1 to N. For example, if the number of the channels is 3 (N=3) and the multiplexing ratio of the channels is desired to be equivalent (ch1:ch2:ch 3=1:1:1), the channel multiplexing ratio number is set to be the ch1=1, the ch2=1, the ch3=1. The channel multiplexing ratio number may be previously set in the multiplexing apparatus 1301 by an administrator, may be set by using a command supplied from an external control terminal (not shown), or may be dynamically set based on the traffic of the data supplied to the respective channels.

The multiplexing section 114 is connected to the storing sections 112-1 to 112-N, the assignment controlling section 113 and the assignment information adding section 115. The multiplexing section 114 receives the assignment command from the assignment controlling section 113. The multiplexing section 114 outputs the read command to the storing sections 112-1 to 112-N based on the assignment command to acquire the fixed length data 1600. The multiplexing section 114 multiplexes the fixed length data 1600 acquired from the storing sections 112-1 to 112-N to create the information data 243. The multiplexing section 114 outputs the created information data 243 to the assignment information adding section 115.

Next, the assignment information adding section 115 is connected to the assignment controlling section 113, the multiplexing section 114 and the frame creating section 116. The assignment information adding section 115 receives the information data 243 from the multiplexing section 114. The assignment information adding section 115 receives the slot assignment information from the assignment controlling section 113. The assignment information adding section 115 adds the slot assignment information 241 or the slot assignment information 242 to the information data 243 to create the block 23. The assignment information adding section 115 outputs the block 23 to the frame creating section 116.

The assignment information adding section 115 creates the different block 23 depending on whether or not the channel arrangement of the slot assignment 263-1 to 263-$p$ recorded in the slot assignment information coincides with the channel arrangement of the slot assignment 263-1 to 263-$p$ added to the information data 243 most recently created. The assignment information adding section 115 adds the assignment information 242 including only the identification signal 261 to the information data 243 if the channel arrangement coincides with each other, only the identification signal 261 indicating the channel arrangement is the same as the most recent one. On the other hand, the assignment information adding section 115 adds the assignment information 241 including the identification signal 261 and the slot assignment 263-1 to 263-$p$ to the information data 243 if the channel arrangement does not coincide with each other, the identification signal 262 and the slot assignment 263-1 to 263-$p$ indicating the channel arrangement is different from the most recent one.

The assignment information adding section 115 does not add the slot assignment 263-1 to 263-$p$ to the information data 243 if the channel arrangement coincides with each other. This is because the demultiplexing apparatus 1302 of the present exemplary embodiment performs the processing based on the slot assignment information the most recently received if the channel arrangement does not change. Accordingly, since it is not necessary to add the slot assignment information to all of the information data 243, this lead to the prevention of a waste of a transmission band.

The frame creating section 116 is connected to the assignment information adding section 115 and the transmission channel 1304. The frame creating section 116 receives the block 23 from the assignment information adding section 115. The frame creating section 116 couples a plurality of the blocks 23 to create the payload data 223. The frame creating section 116 adds the header 221 to the head of the payload data 223, and adds the trailer 222 to the end of the payload data 223. The frame creating section 116 outputs the frame as the data stream to the transmission channel 1304.

4. Configuration of Assignment Controlling Section

Next, the configuration of the assignment controlling section 113 according to the present exemplary embodiment will be described. FIG. 11 is a view showing the configuration of the assignment controlling section 113 and a flow of signals in the multiplexing apparatus 1301 according to the present exemplary embodiment. The assignment controlling section 113 according to the present exemplary embodiment includes an assignment calculating section 331 and a cyclic output ch determining section 332.

The cyclic output ch determining section 332 is connected to the storing sections 112-1 to 112-N and the assignment calculating section 331. The cyclic output ch determining section 332 determines the channel of which the fixed length data 1600 can be read next. The cyclic output ch determining section 332 receives the effective data numbers EMP[1] to EMP[N] from the storing sections 112-1 to 112-N. The cyclic output ch determining section 332 receives a next output ch determination instruction EN from the assignment calculating section 331. The cyclic output ch determining section 332 determines the ch of which the fixed length data can be read based on the effective data numbers EMP[1] to EMP[N] and the next output ch determination instruction EN. Here, the cyclic output ch determining section 332 does not select the ch of which the fixed length data cannot be read because the fixed length data 1600 is not stored. The cyclic output ch determining section 332 outputs the determined channel as the ch number to the assignment calculating section 331. In addition, if the fixed length data is not stored in the storing sections 112-1 to 112-N, the cyclic output ch determining section 332 creates an all chs effective data no signal AEMP indicating that there is no channel of which the fixed length data 1600 can be read, and outputs the all chs effective data no signal AEMP to the assignment calculating section 331.

The assignment calculating section 331 is connected to the cyclic output ch determining section 332, the multiplexing section 114 and the assignment information adding section 115. The assignment calculating section 331 holds the channel multiplexing ratio number. The channel multiplexing ratio number indicates an assignment capable slot number which is the number of slots capable of being assigned to the information data 243 and indicates the slot number which is the number of slots to be assigned to respective channels at the same time. The assignment calculating section 331 receives the ch number i from the cyclic output ch determining section 332 and calculates the assignment of the slots 25 in the information data 243 based on the assignment capable slot number and the channel multiplexing ratio number. At this time, the number of slots 25 to which the assignment calculating section 331 assigns for the ch number i is determined based on the channel multiplexing ratio number. The channel multiplexing ratio number is set for the respective channels.

After determining the assigned number of slots 25 for the ch number i, the assignment calculating section 331 subtracts the assigned number of slots from the assignment capable slot number. The assignment calculating section 331 repeatedly performs the slot assignment processing for the ch number i supplied from the cyclic output ch determining section 332 until the assignment capable slot number becomes "0". The assignment calculating section 331 finishes the channel assignment for one information data 243 when the assignment capable slot number becomes "0". The assignment calculating section 331 outputs the result of the channel assignment for one information data 243 as a slot assignment oa, a slot number SN and a block number BN to the multiplexing section 114 and the assignment information adding section 115. In addition, the assignment calculating section 331 outputs the assignment command RE to the multiplexing section 114 at the same time of outputting the result of the channel assignment.

The flow of the signals in the multiplexing apparatus 1301 with respect to the assignment controlling section 113 having the above-mentioned configuration is approximately described below. The assignment controlling section 113 outputs the assignment command RE, the slot assignment oa, the slot number SN and the block number BN to the multiplexing section 114 and the assignment information adding section 115. The multiplexing section 114 outputs read signals re[1] to re[N] to the storing sections 112-1 to 112-N based on the assignment command RE, the slot assignment oa, the slot number SN and the block number BN. The storing sections 112-1 to 112-N outputs fixed length data d[1] to d[N] to the multiplexing section 114 based on the read signals re[1] to re[N]. The multiplexing section 114 creates information data ODAT based on the fixed length data d[1] to d[N] and outputs the information data ODAT to the assignment information adding section 115. The assignment information adding section 115 adds the assignment information 241, 242 to the information data ODAT based on the slot assignment oa, the slot number SN and the block number BN.

These are the configuration of the assignment controlling section 113 according to the present exemplary embodiment.

5. Configuration of Demultiplexing Apparatus 1302

Next, with reference to FIG. 8, the configuration of the demultiplexing apparatus 1302 according to the present exemplary embodiment will be described. The demultiplexing apparatus 1302 according to the present exemplary embodiment includes coupling sections 121-1 to 121-N, a distributing section 122 a distribution controlling section 123, an assignment information detecting section 124 and a frame terminating section 125.

The frame terminating section 125 is connected to the transmission channel 1304 and the assignment information detecting section 124. The frame terminating section 125 receives the data stream from the transmission channel 1304. The frame terminating section 125 frame-synchronizes the data stream to detect the frames 21. The frame terminating section 125 terminates the frames 21 to acquire the payload data 223 stored in the frames 21. The frame terminating section 125 outputs the payload data 223 to the assignment information detecting section 124.

Next, the assignment information detecting section 124 is connected to the frame terminating section 125, a distribution controlling section 123 and a distributing section 122. The assignment information detecting section 124 detects the assignment information 241 (or the assignment information 242) based on the payload data 223. The assignment information detecting section 124 specifies delimiting positions of the blocks 23-1 to 23-p based on the assignment information 241 (or 242). In addition, the assignment information detecting section 124 outputs the assignment information 241 (or 242) to the distribution controlling section 123. Furthermore, the assignment information detecting section 124 outputs the information data 243 obtained by separating the assignment information 241 (or 242) from the respective blocks.

Next, the distribution controlling section 123 is connected to the assignment information detecting section 124 and the distributing section 122. The distribution controlling section 123 receives the assignment information 241 (or 242) from the assignment information detecting section 124. The distribution controlling section 123 creates the distribution information based on the assignment information 241 (242). The distribution information is information for separating the slots 25-1 to 25-p from the information data to distribute them to the respective channels 1 to N. The distribution controlling section 123 creates the distribution information which is the same as that of the most recently block when receiving the assignment information 242. This is because the assignment information 242 is added when the slot assignment of the slots 25-1 to 25-p stored in the information data 243 of the presently supplied block 23 coincides with the slot assignment of the most recently supplied block 23. On the other hand, the distribution controlling section 123 creates the distribution information based on the slot assignment 263-1 to 263-N included in the assignment information 241 when receiving the assignment information 241. This is because the assignment information 241 is added when the slot assignment of the slots 25-1 to 25-p stored in the information data 243 of the presently supplied block 23 does not coincide with the slot assignment of the most recently supplied block 23.

Next, the distributing section 122 is connected to the assignment information detecting section 124, the distribution controlling section 123 and the coupling sections 121-1 to 121-N. The distributing section 122 receives the information data 243 from the assignment information detecting section 124. The distributing section 122 receives the distribution information from the distribution controlling section 123. The distributing section 122 separates the fixed length data 1600 stored in the slots 25-1 to 25-p of the information data 243. The distributing section 122 outputs the fixed length data 1600 acquired from the slots 25-1 to 25-p to the coupling sections 121-1 to 121-N corresponding to the channels 1 to N specified by the distribution information based on the distribution information.

Next, the coupling sections 121-1 to 121-N are connected to the distributing section 122 and the subsequent stage processing section not shown in FIG. 8. The coupling sections 121-1 to 121-N receive the fixed length data 1600 from the distributing section 122. The coupling sections 121-1 to 121-N reproduce the information signals 1306-1 to 1306-N, respectively, by decoding the fixed length data 1600 using the 8B/10B conversion code or the 64B/66B conversion code. The coupling sections 121-1 to 121-N outputs the information signals 1306-1 to 1306-N as output signals to the subsequent stage processing section. Here, when outputting the information signals 1306-1 to 1306-N, the coupling sections 121-1 to 121-N detects the delimiting positions of the variable length frames of the information signals 1305-1 to 1305-N to outputs every variable length frame as a unit. That is, the coupling sections 121-1 to 121-N output the information signals 1306-1 to 1306-N as the output signals which are the reproduced information signals 1305-1 to 1305-N having been divided into the fixed length data 1600.

Here, with reference to FIG. 12, a flow of signals in the demultiplexing apparatus 1302 according to the present exemplary embodiment. FIG. 12 is a view showing the flow of the signals in the demultiplexing apparatus 1302 according to the present exemplary embodiment.

The frame terminating section 125 outputs payload data irpd and data irpe indicating the payload is effective to the assignment information detecting section 124. The assignment information detecting section 124 outputs the assignment information ai and assignment information effective data aie indicating the assignment information ai effective to the distribution controlling section 123. In addition, the assignment information detecting section 124 outputs information data irad and block flags bf indicating block delimiting positions in the information data to the distributing section 122. The distribution controlling section 123 outputs distribution information ide[1] to ide[N] to the distributing section 122. The distributing section 122 outputs distribution outputs ord[1] to ord[N] distributed to the coupling section 121-1 to 121-N and data effective signals ie[1] to ie[N] indicating the distribution outputs ord[1] to ord[N] are effective, respectively, to the coupling sections 121-1 to 121-N.

These are the configuration of the demultiplexing apparatus 1302 according to the present exemplary embodiment. In addition, the above description so far is about the configuration of the multiplexing transmission system according to the present exemplary embodiment.

[Operation]

Next, an operation of the multiplexing transmission system according to the present exemplary embodiment will be described.

6. Operation of Multiplexing Apparatus 1301

Figure 13:
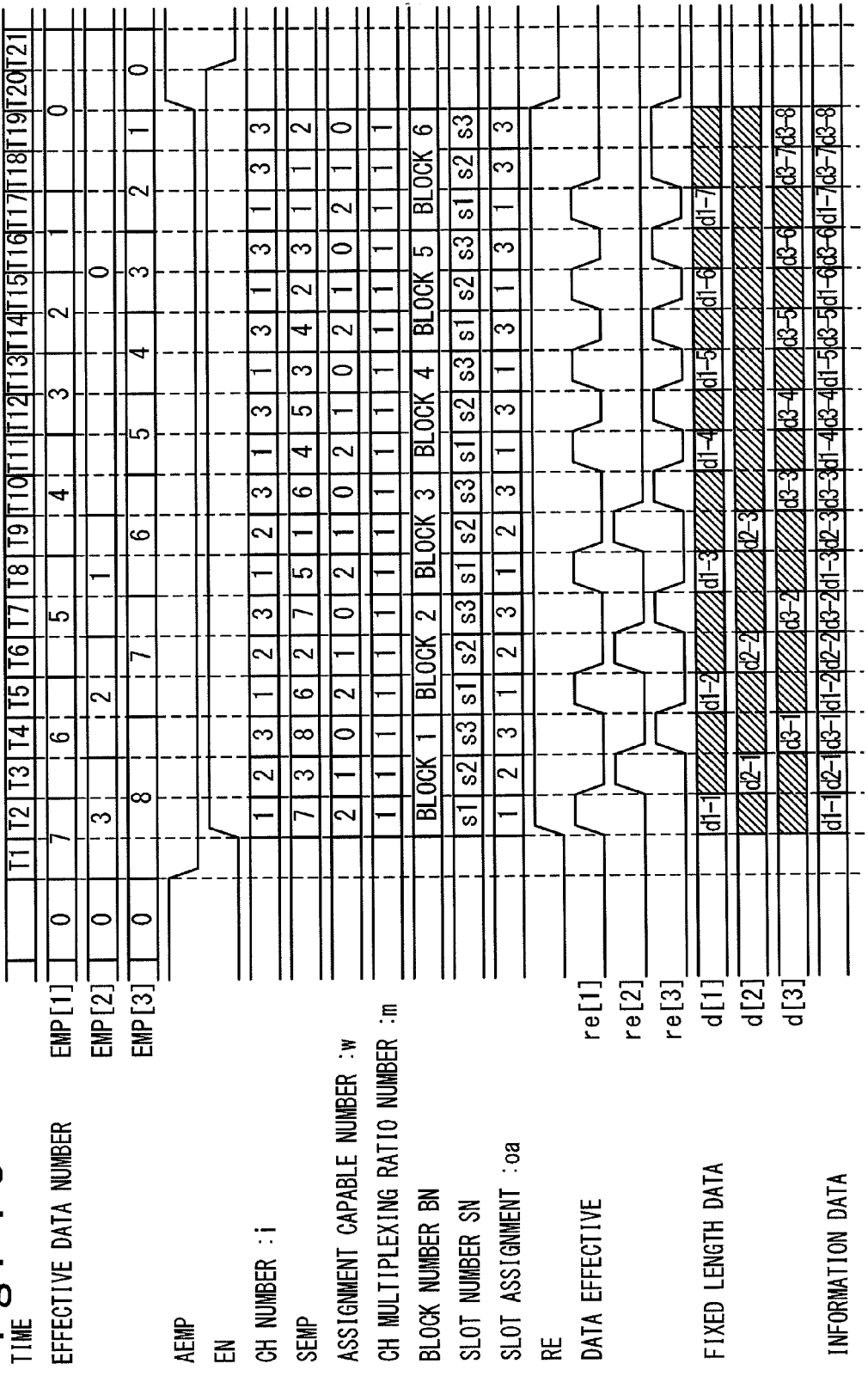
FIG. 13 is a timing chart showing an operation of the multiplexing apparatus 1301 according to the first exemplary embodiment.

First, an operation of the multiplexing apparatus 1301 according to the present exemplary embodiment will be described. FIG. 13 is a timing chart showing the operation of the multiplexing apparatus 1301 according to the present exemplary embodiment. Here, the timing chart of FIG. 13 shows the case that the number of channels of the multiplexing apparatus 1301: N=3, the number of slots of the information data 243: p=3, and the channel multiplexing ratio number of the channels: m1 to m3=1. However, the present exemplary embodiment can be applied to the case that the number of channels=N, the number of slots of the information data 243=p, and the channel multiplexing ratio number of the channels=m1 to mn are arbitrary. First, items of FIG. 13 will be described.

The time indicates a time slot. The effective data numbers EMPs are signals between the storing sections 112-1 to 112-N and the cyclic output ch determining section 332. The EMP indicates the number of the fixed length data 1600 stored in each of the storing sections 112-1 to 112-N. The all chs effective data no signal AEMP, the next output ch determination instruction EN, the ch number i, and the determined channel effective data number SEMP are signals between the cyclic output ch determining section 332 and the assignment calculating section 331. The AEMP indicates that all channels do not have effective fixed length data 1600 when it is in the high level, and indicates any of the channels has effective length data 1600 when it is in the low level. The EN determines the next output channel when it is in the high level, and holds the previous output channel when it is in the low level. The value of i indicates the channel number determined by the cyclic output ch determining section 332. The SEMP indicates the number (EMP (i)) of the fixed length data 1600 stored in the storing sections 112-1 to 112-N corresponding to the channel specified by i.

The block number BN, the slot number SN and the slot assignment oa are signals between the assignment calculating section 331 and the multiplexing section 114/the assignment information adding section 115. The block number BN indicates the block to which the respective signals belong at the time slot. The slot number SN indicates the slot number at the time slot. The slot assignment oa indicates the channel number i assigned to the slot number SN of the block number BN at the time slot. The assignment instruction RE is a signal between the assignment calculating section 331 and the multiplexing section 114. The RE indicates whether or not the fixed length data 1600 is assigned to the slot number SN of the block number BN at the time slot. The RE indicates that the fixed length data 1600 is assigned when it is in the high level. On the other hand, the RE indicates that the fixed length data 1600 is not assigned when it is in the low level. That is, the multiplexing section 114 outputs the information data 243 in which the fixed length data 1600 are multiplexed to the assignment information adding section 115 during the RE being in the high level.

The re[1] to re[N] are signals between the storing sections 112-1 to 112-N and the multiplexing section 114. The re[1] to re[N] are the read signal of the fixed length data 1600 stored in the storing sections 112-1 to 112-N corresponding to the respective channels. The re[1] to re[N] are instructions for reading the fixed length data 1600 from the corresponding storing sections 112-1 to 112-N when they are in the high level. On the other hand, each of the re[1] to re[N] is an instruction for not reading the fixed length data 1600 when it is in the low level. Here, as described above, since the number of channels N=3, the re[1] to re[N] are the re[1] to re[3]. The d[1] to d[N] indicate the fixed length data 1600 read by the storing sections 112-1 to 112-N in response to the re[1] to re[N], respectively. For ease of description, the expression of d[*]-[#] is used in which the [*] indicates the channel number and the [#] indicates the input order. That is, d1-1 means the fixed length data 1600 of the ch number=1 and the first data. The information data ODAT is a signal between the multiplexing section 114 and the assignment information adding section 115. The ODAT is data multiplexed by the multiplexing section 114. Here, the described characters and numerals are similar to the d[1] to d[N]. Hereinafter, with reference to FIGS. 8 to 13, the operation of the multiplexing apparatus will be described.

First, the dividing sections 111-1 to 111-3 receive the information signals 1305-1 to 1305-3, respectively. The dividing sections 111-1 to 111-3 create the fixed length data 1600 from the information signals 1305-1 to 1305-3 by encoding using codes such as an 8B/10B conversion code, 64B/66B conversion code and the like. Consequently, the dividing sections 111-1 to 111-3 make the delimiting positions of the information signals enable to be identified. The dividing sections 111-1 to 111-3 output the fixed length data 1600 to the storing sections 112-1 to 112-3, respectively.

Next, the storing sections 112-1 to 112-3 receive the fixed length data 1600 from the dividing sections 111-1 to 111-3, respectively. The storing sections 112-1 to 112-3 store the fixed length data 1600. The storing sections 112-1 to 112-3 output the number of the stored fixed length data as the effective data numbers EMP[1] to EMP[3] to the cyclic output ch determining section 332.

Then, the cyclic output ch determining section 332 receives the effective data numbers EMP[1] to EMP[3] from the storing section 112-1 to 112-3. The cyclic output ch determining section 332 creates the all chs effective data no signal AEMP based on the EMP and outputs it to the assignment calculating section 331. When any of the EMP [1] to EMP [3] becomes non-"0", the cyclic output ch determining section 332 sets the AEMP to the low level and outputs it to the assignment calculating section 331. On the other hand, when all of the EMP [1] to EMP [3] become "0", the cyclic output ch determining section 332 sets the AEMP to the high level and outputs it to the assignment calculating section 331.

Subsequently, the assignment calculating section 331 receives the all chs effective data no signal AEMP from the cyclic output ch determining section 332. The assignment calculating section 331 outputs the next output ch determination instruction EN to the cyclic output ch determining section 332 based on the AEMP. The assignment calculating section 331 outputs the EN with the high level when the AEMP is in the low level. The assignment calculating section 331 outputs the EN with the low level when the AEMP is in the high level.

Next, the cyclic output ch determining section 332 receives the next output ch determination instruction EN from the assignment calculating section 331. The cyclic output ch determining section 332 performs the cyclic processing to determine the ch number i to be output based on the EN. The cyclic output ch determining section 332 determines the ch number i by cyclically selecting the channels 1 to 3 when the EN is in the high level. That is, when any of the EMP[1] to EMP[3] is not "0", the cyclic output ch determining section 332 determines the ch number by cyclically selecting the channels 1 to 3. On the other hand, the cyclic output ch determining section 332 does not determine the ch number i when the EN is in the low level. That is, when all of the EMP[1] to EMP[3] are "0", the cyclic output ch determining section 332 does not determine the ch number i. The cyclic output ch determining section 332 outputs the determined ch number i and the effective data number EMP of the storing sections 112-1 to 112-3 corresponding to the determined ch number i, as the effective data number SEMP of the determined ch to the assignment calculating section 331.

Then, the assignment calculating section 331 receives the ch number i and the effective data number SEMP of the determined ch from the cyclic output ch determining section 332. The assignment calculating section 331 performs the slot assignment processing based on the ch number i, the SEMP, the channel multiplexing ration number m and the assignment capable number w to determine the block number BN, the slot number SN and the slot assignment oa. The assignment calculating section 331 outputs the BN, the SN and the oa to the multiplexing section 114 and the assignment information adding section 115. In addition, the assignment calculating section 331 outputs the assignment instruction RE to the multiplexing section 114.

Next, the multiplexing section 114 receives the block number BN, the slot number SN, the slot assignment oa and the assignment instruction RE. The multiplexing section 114 outputs the read signal re[i] set to the high level to the storing sections 112-1 to 112-N corresponding to the ch number i indicated by the slot assignment oa, in response to the assignment instruction RE.

Then, the storing sections 112-1 to 112-N receive the read signals re[i]. The storing sections 112-1 to 112-N outputs the stored fixed length data d[i] in response to the read signals re[i] to the multiplexing section 114.

Next, the multiplexing section 114 receives the fixed length data d[i] from the storing sections 112-1 to 112-N. The multiplexing section 114 creates the information data ODAT by using the fixed length data d[1] to d[3] supplied every time slot. The multiplexing section 114 outputs the information data ODAT to the assignment information adding section 115.

Subsequently, the assignment information adding section 115 receives the block number BN, the slot number SN and the slot assignment oa from the assignment calculating section 331. In addition, the assignment information adding section 115 receives the information data ODAT from the multiplexing section 114. The assignment information adding section 115 compares the oa of the block to be presently processed with the oa of the block already processed one step before. The assignment information adding section 115 creates the assignment information ai based on the comparison result. The assignment information adding section 115 outputs the assignment information ai, the information data ODAT' and the block number BN' to the frame creating section 116.

The frame creating section 116 receives the assignment information ai, the information data ODAT' and the block number BN' from the assignment information adding section 115. The frame creating section 116 sets the assignment information ai and the information data ODAT' into the payload data 223 based on the block number BN'. The frame creating section 116 adds the header 221 and the trailer 222 to the payload data 223 to create the frame 21. The frame creating section 116 outputs the frame 21 as the data stream to the transmission channel 1304.

Subsequently, for example, with reference to FIG. 13, at the time slot T1, the cyclic output ch determining section 332 receives the effective data numbers EMP[1] to EMP[3] from the storing sections 112-1 to 112-3 and outputs the all chs effective data no signal AEMP with the low level to the assignment calculating section 331. At the time slot T2, the assignment calculating section 331 outputs the next output ch determination instruction EN with the high level to the cyclic output ch determining section 332 in response to the AEMP with the low level. The cyclic output ch determining section 332 determines the ch number i (=1) based on the cyclic processing in response to the next output ch determination instruction EN with the high level. The cyclic output ch determining section 332 outputs the ch number i (=1) and the effective data number SEMP of the ch (=EMP[1]=7) to the assignment calculating section 331.

The assignment calculating section 331 receives the ch number i (=1) and the SEMP (=7). The assignment calculating section 331 performs the slot assignment processing based on the ch number i (=1), the SEMP (=7), the channel multiplexing ratio number m (=ch1:ch2:ch3=1:1:1) and the assignment capable number w (=2). The assignment calculating section 331 determines the block number BN (=1), the slot number SN (=1) and the slot assignment oa (=ch1) based on the slot assignment processing. The assignment calculating section 331 outputs the block number BN (=1), the slot number SN (=1) and the slot assignment oa (=ch1) to the multiplexing section 114 and the assignment information adding section 115. In addition, the assignment calculating section 331 outputs the RE with the high level to the multiplexing section 114.

The multiplexing section 114 receives the block number BN (=1), the slot number SN (=1), the slot assignment oa (=ch1) and the RE with the high level. The multiplexing section 114 selects the storing section 112-1 corresponding to the ch1 based on the slot assignment oa (=ch1) in response to the RE with the high level. The multiplexing section 114 sets the read signal re [1] to the high level and outputs it to the storing section 112-1. The storing section 112-1 outputs the fixed length data d[1] (=d1-1) to the multiplexing section 114 in response to the re[1] with the high level. The multiplexing section 114 receives the fixed length data d[1] (=d1-1) from the storing section 112-1.

After that, the operation similar to the above-mentioned operation is performed and then, at the time slot T3, the multiplexing section 114 further receives the fixed length data d [2] (=d2-1) from the storing section 112-2. At the time slot T4, the multiplexing section 114 further receives the fixed length data d[3] (=d3-1) from the storing section 112-3. At the time slot T4, because of the assignment capable number w (=0), the multiplexing section 114 outputs the fixed length data d[1] to d[3] (=d1-1, d2-1, d3-1) as the information data ODAT to the assignment information adding section 115. As the operation mentioned above, at the time slots T4, T7, T10, T13, T16 and T19, similarly, the multiplexing section 114 outputs the information data ODAT to the assignment information adding section 115.

Here, the storing sections 112-1 to 112-3 store the fixed length data 1600 at the time slots T2 to T10. The channel multiplexing ratio number m is, as mentioned above, ch1:ch2:ch3=1:1:1. With reference to the information data ODAT, it is confirmed that, at the time slots T2 to T10, the multiplexing ratio of the fixed length data 1600 coincides with the channel multiplexing ratio number of ch1:ch2:ch3=1:1:1.

In addition, the storing section 112-2 does not store the fixed length data 1600 at the time slots T11 to T17. Therefore, the multiplexing section 114 reads the fixed length data 1600 from the storing section 112-1 and 112-3. Even in this case, with reference to the information data ODAT, it is confirmed that, at the time slots T11 to T17, the multiplexing ratio of the fixed length data 1600 coincides with the channel multiplexing ratio number of ch1:ch3=1:1.

These are the description of the operation of the multiplexing apparatus 1301 according to the present exemplary embodiment.

7. Operation of Slot Assignment of Assignment Controlling Section 113

Figure 14A:
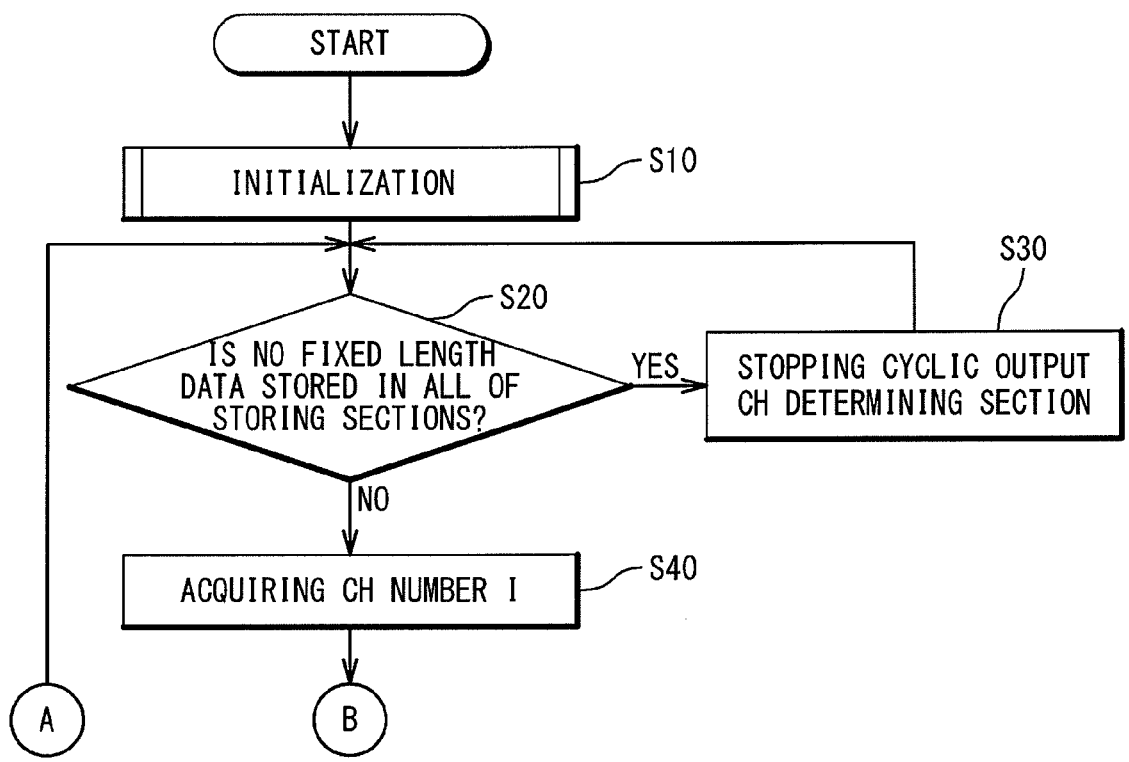
FIG. 14A is a flowchart showing an operation of a slot assignment processing of the assignment controlling section 113 according to the first exemplary embodiment.
Figure 14B:
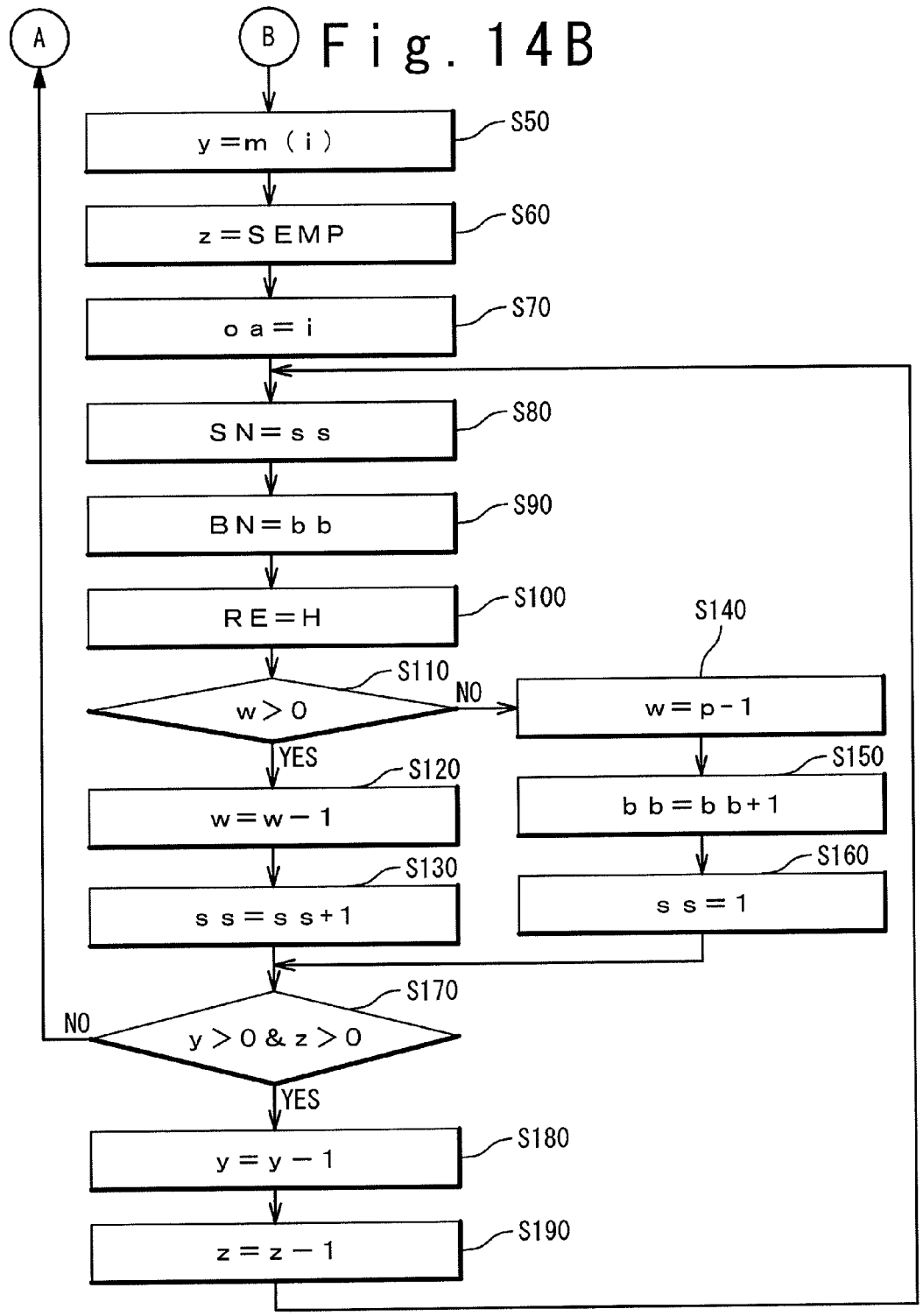
FIG. 14B is a flowchart showing the operation of the slot assignment processing of the assignment controlling section 113 according to the first exemplary embodiment.

Next, an operation of the slot assignment processing of the assignment controlling section 113 according to the present exemplary embodiment with reference to FIGS. 14A and 14B. FIGS. 14A and 14B are flowcharts showing the operation of the slot assignment processing of the assignment controlling section 113 according to the present exemplary embodiment.

First, the assignment calculating section 331 initializes variables used for the processing (Step S10). After the initialization, the assignment calculating section 331 receives the all chs effective data no signal AEMP from the cyclic output ch determining section 332. The assignment calculating section 331 judges whether or not the readable fixed length data 1600 is stored in all of the storing sections 112-1 to 112-N based on the AEMP (Step S20). When the AEMP is in the high level, namely, no readable fixed length data 1600 is stored in all of the storing sections 112-1 to 112-N (Step S20: Yes), the assignment calculating section 331 sets the next output ch determination instruction EN to the low level and outputs it to the cyclic output ch determining section 332. The cyclic output ch determining section 332 stops in response to the EN with the low level (Step S30). In this case, the operation goes back to the step S20 and the assignment calculating section 331 repeats the above judging process until the AEMP becomes in the low level.

On the other hand, when the AEMP is in the low level, namely, the readable fixed length data 1600 is stored in any of the storing sections 112-1 to 112-N (Step S20: No), the assignment calculating section 331 sets the EN to the high level and outputs it to the cyclic output ch determining section 332. The cyclic output ch determining section 332 outputs the ch number i of which the fixed length data 1600 is read and the effective data number SEMP of the determined ch to the assignment calculating section 331 in response to the EN with the high level (Step S40).

The assignment calculating section 331 sets a channel multiplexing ratio number remaining number y to a channel multiplexing ratio number m(i) set each ch into based on the ch number i (Step S50). Here, the channel multiplexing ratio number m(i) indicates the channel multiplexing ratio number m which is set for the ch number i. The channel multiplexing ratio number remaining number y indicates the remaining number of the slots to which the channel can be assigned at one time. The assignment calculating section 331 executes the subtraction from the channel multiplexing ratio number remaining number y every time the slot assignment is performed, and when the channel multiplexing ratio number remaining number y becomes "0", the assignment calculating section 331 makes the transition to the next channel of the assignment processing.

The assignment calculating section 331 sets an effective data remaining number z to the SEMP (Step S60). The assignment calculating section 331 sets the slot assignment oa to the ch number i (Step S70). The assignment calculating section 331 sets the slot number SN to an update slot number ss (Step S80). The assignment calculating section 331 sets the block number BN to an update block number bb (Step S90). Furthermore, the assignment calculating section 331 sets the assignment instruction RE to the high level to instruct the multiplexing section 114 to assign the fixed length data 1600 to the slots 25 (Step S100). Here, the effective data remaining number z is the remains of the effective data number of the storing sections 112-1 to 112-N corresponding to the ch number i determined by the cyclic output ch determining section 332. The assignment calculating section 331 executes the subtraction from the effective data remaining number z every time the slot assignment processing is performed, and when the effective data remaining number z becomes "0", the assignment calculating section 331 makes the transition to the next channel of the slot assignment processing. Here, the bb indicates the updated block number. The ss indicates the updated slot number. In addition, the steps S60 to S100 may be executed without regard to their execution order. The steps S60 to S100 may be executed at the same time.

The assignment calculating section 331 judges whether or not an assignment capable number w is "w>0" (Step S110). That is, the assignment calculating section 331 judges whether or not the remains of the assignment capable number w exist. When the assignment capable number w is "w>0" (Step S110: Yes), the assignment calculating section 331 subtracts "1" from the assignment capable number w (Step S120). That is, the assignment calculating section 331 calculates "w=w−1". In addition, the assignment calculating section 331 adds "1" to the update slot number ss (Step S130). That is, the assignment calculating section 331 calculates "ss=ss+1". In this way, the assignment calculating section 331 updates the assignment capable number w and the update slot number ss. Here, the steps S120 to S130 may be executed without regard to their execution order. The steps S120 to S130 may be executed at the same time.

On the other hand, When the assignment capable number w is "w≤0" (Step S110: No), the assignment calculating section 331 sets the assignment capable number w to the value of "p−1", in which the p is the number of the slots per block (Step S140). The assignment calculating section 331 adds "1" to the update block number bb (Step S150). That is, the assignment calculating section 331 calculates "bb=bb+1". The assignment calculating section 331 sets the update slot number ss to "1" (Step S160). That is, the assignment calculating section 331 sets "ss=1". In this way, the assignment calculating section 331 updates the assignment capable number w, the update block number bb and the update slot number ss. Here, the assignment capable number w of "w≤0" means the completion of the channel assignment to all slots in one block. Here, the steps S140 to S160 may be executed without regard to their execution order. The steps S140 to S160 may be executed at the same time.

The assignment calculating section 331 judges whether or not both of the channel multiplexing ratio number remaining number y and the effective data remaining number tare larger than "0". That is, the assignment calculating section 331 judges whether or not "y>0 and z>0" is true (Step S170). When both of the channel multiplexing ratio number remaining number y and the effective data remaining number z are larger than "0" (Step S170: Yes), namely, when "y>0 and z>0" is true, the assignment calculating section 331 subtracts "1" from the channel multiplexing ratio number remaining number y (Step S180). That is, the assignment calculating section 331 calculates "y=y−1". The assignment calculating section 331 subtracts "1" from the effective data remaining number z (Step S190). That is, the assignment calculating section 331 calculates "z=z−1". In this way, the assignment calculating section 331 updates both of the channel multiplexing ratio number remaining number y and the effective data remaining number z. Here, the steps S180 to S190 may be executed without regard to their execution order. The steps S180 to S190 may be executed at the same time. After that, the process goes back to the step S80.

On the other hand, when any of the channel multiplexing ratio number remaining number y and the effective data remaining number z is equal to or less than "0", namely, when "y>0 and z>0" is not true, the assignment calculating section 331 completes the slot assignment processing to the present ch number i. In this case, the process goes back to the step S20. The fact that the channel multiplexing ratio number remaining number y is equal to or less than "0" means that the remains of the number of the slots assigned at one time does not exist. In addition, the fact that the effective data remaining number z is equal to or less than "0" means that the readable fixed length data 1600 is not stored in the storing sections 112-1 to 112-N corresponding to the ch number i.

These are the description of the operation of the slot assignment processing of the assignment controlling section 113 according to the present exemplary embodiment.

8. Operation of Assignment Information Adding Section 115

Figure 16:
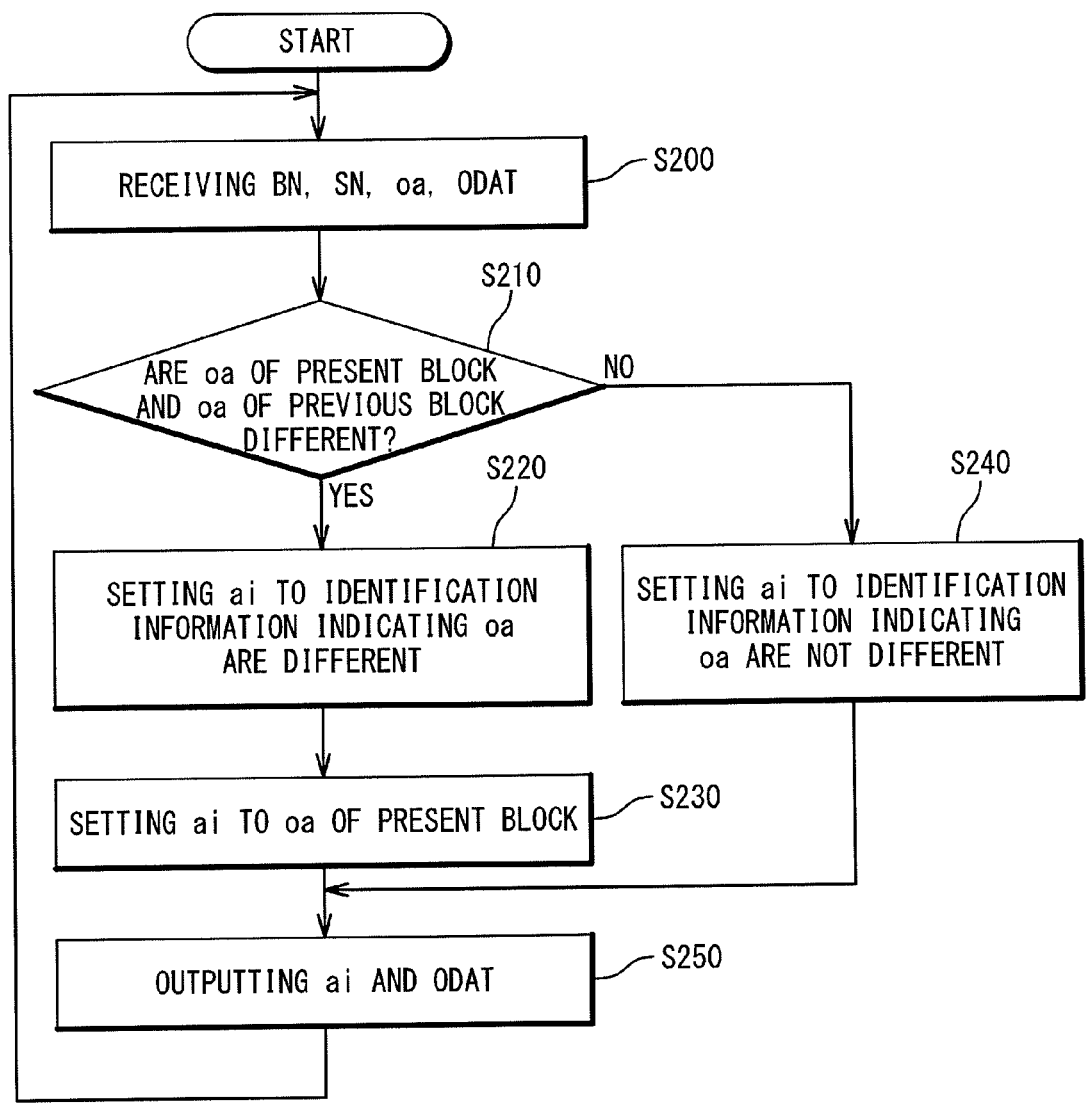
FIG. 16 is a flowchart showing the operation of the assignment information adding section 115 according to the first exemplary embodiment.

Next, with reference to FIGS. 15 and 16, an operation of the assignment information adding section 115 will be described according to the present exemplary embodiment. FIG. 15 is a timing chart showing the operation of the assignment information adding section 115 according to the present exemplary embodiment. FIG. 16 is a flowchart showing the operation of the assignment information adding section 115 according to the present exemplary embodiment. Here, as similar to FIG. 13, the timing chart of FIG. 15 shows the case that the number of channels: N=3, the number of slots of the information data 243: p=3, and the channel multiplexing ratio number of the channels: ch1:ch2:ch3=1:1:1. However, the present exemplary embodiment can be applied to the case that the number of channels=N, the number of slots of the information data 243=p, and the channel multiplexing ratio number of the channels=m1 to mn are arbitrary. First, items of FIG. 15 will be described.

The time indicates a time slot. The block number BN, the slot number SN and the slot assignment oa are signals between the assignment calculating section 331 and the assignment information adding section 115. The information data ODAT is a signal between the multiplexing section 114 and the assignment information adding section 115. The block number BN', the information data ODAT' and the assignment information ai are signals between the assignment information adding section 115 and the frame creating section 116. The block number BN' is a delayed signal of the block number BN. The information data ODAT' is a delayed signal of the information data ODAT. The assignment information ai is a signal created by the assignment information adding section 115. The assignment information ai'1 (the assignment information 6-1) and the assignment information ai'4 (the assignment information 6-4) are the same as the assignment information 241 described with reference to FIG. 9. That is, the assignment information ai'1 (the assignment information 6-1) and the assignment information ai'4 (the assignment information 6-4) include the identification signal 261 and the slot assignment 263-1 to 263-p. The assignment information ai'2 (the assignment information 6-2) and the assignment information ai'3 (the assignment information 6-3) are the same as the assignment information 242 described with reference to FIG. 9. That is, the assignment information ai'2 (the assignment information 6-2) and the assignment information ai'3 (the assignment information 6-3) include only the identification signal 261 and do not include the slot assignment 263-1 to 263-p.

According to the timing chart of FIG. 15, the assignment information adding section 115 receives the block number BN, the slot number SN and the slot assignment oa from the assignment calculating section 331. The assignment information adding section 115 receives the information data ODAT from the multiplexing section 114. The assignment information adding section 115 compares the oa of the block to be presently processed with the oa of the block already processed just one time before. The assignment information adding section 115 creates the assignment information ai based on the comparison result. The assignment information adding section 115 outputs the assignment information ai, the information data ODAT' synchronizing the assignment information ai and the block number BN' to the frame creating section 116.

Next, with reference to FIG. 16, the specific operation of the assignment information adding section 115 will be described.

First, the assignment information adding section 115 receives the block number BN, the slot number SN and the slot assignment oa from the assignment calculating section 331, and receives the information data ODAT from the multiplexing section 114 (Step 200). The assignment information adding section 115 compares the slot assignment oa of the present block with the slot assignment oa of the previous block just one time before and judges whether or not they are different from each other (Step S210). When the slot assignment oa are different from each other (Step S210: Yes), the assignment information adding section 115 creates the identification information 261 indicating that the slot assignment oa are different from each other and sets the assignment information ai to it (Step S220). The assignment information adding section 115 additionally sets the assignment information ai to the slot assignment oa of the present block (Step S230). Then, the assignment information adding section 115 outputs the assignment information ai and the information data ODAT to the frame creating section 116 (Step S250). After that, the process goes back to the step S200 to execute the processing for the next block.

On the other hand, When the slot assignment oa are not different from each other (Step S210: No), the assignment information adding section 115 creates the identification information 261 indicating that the slot assignment oa are not different from each other and sets the assignment information ai to it (Step S240). The assignment information adding section 115 does not set the assignment information ai to the slot assignment oa. In this way, when the slot assignment oa presently supplied and the slot assignment oa of the block just one time before are not different from each other, the assignment information adding section 115 does not sets the assignment information ai to the slot assignment oa. This leads to the suppression of the band of the data stream. The assignment information adding section 115 outputs the assignment information ai and the information data ODAT to the frame creating section 116 (Step S250). After that, the process goes back to the step S200 to execute the processing for the next block. Then, the process goes back to the step S1005.

For example, in FIG. 15, the assignment information adding section 115 receives the block number BN=1. Because there is no previous block, the assignment information adding section 115 judges that the slot assignment oa is different form the slot assignment oa of the previous block just one time before. Therefore, the assignment information ai added to the block number BN=1 includes the identification signal 261 and the slot assignment oa of the present block (assignment information ai'1 (assignment information 6-1)). Subsequently, the assignment information adding section 115 judges that there is no difference in the comparison of the slot assignment oa between the block number BN=1 and the block number BN=2, and the block number BN=2 and the block number BN=3. Therefore, the assignment information adding section 115 adds the assignment information ai including only the identification signal 261 to the block number BN=2 and 3 (assignment information ai'2 (assignment information 6-2), assignment information ai'3 (assignment information 6-3). Furthermore, the assignment information adding section 115 judges that there is a difference in the comparison of the slot assignment oa between the block number BN=3 and the block number BN=4. Therefore, the assignment information adding section 115 adds the assignment information ai including the identification signal 261 and the slot assignment oa to the block number BN=4 (assignment information ai'1 (assignment information 6-1).

Next, a format of the assignment information ai according to the present exemplary embodiment will be described. FIG. 17 is a view showing the format of the assignment information ai according to the present exemplary embodiment. Here, FIG. 17 shows the example that the number of channels: N=3, the number of slots of the information data 243: p=3, and the channel multiplexing ratio number m of the channels: ch1: ch2:ch3=1:1:1.

In the case that the slot assignment oa of the present block and the slot assignment oa of the previous block just one time before are different from each other (there is a difference), the assignment information ai has the format including the identification information 261 and the slot assignment oa. In the present description, due to the number of the slots: p=3, the slot assignment oa of the slots 1 to 3 exists for three channels. Each slot assignment oa has 2 bits and the channel number can be identified by the assignment of the bits. In addition, the identification signal 261 has 1 bit and is set to "0" when the slot assignment oa are different from each other. Here, the number of the slot assignment oa of the assignment information ai and the number of the bits of the slot assignment oa vary depending on the number of the channels of the multiplexing apparatus 1301.

on the other hand, in the case that the slot assignment oa of the present block and the slot assignment oa of the previous block just one time before coincide with each other (there is no difference), the assignment information ai has the format including only the identification information 261. The identification information has, similar to the above, 1 bit and is set to "1" when the slot assignment oa are not different from each other.

For example, the assignment information ai'1 (assignment information 6-1) added to the block 1 shown in FIG. 15 includes, to indicate that there in a difference in the slot assignment oa, the assignment information 261 and the slot assignment oa. In the assignment information ai'1 (assignment information 6-1), the assignment information 261 is set to the bit "0" which indicates that there in a difference in the slot assignment oa. In addition, in the assignment information ai'1 (assignment information 6-1), the bits based on the slot assignment oa are stored. In the assignment information ai'1 (assignment information 6-1), since the slot assignment oa is the ch1, the ch2 and the ch3, the slot assignment oa is set the bits "011011" corresponding to the respective channels. Consequently, the assignment information ai'1 (assignment information 6-1) is set to the bit-sequence "0011011" including the identification information 261 and the slot assignment oa.

On the other hand, the assignment information ai'2 (assignment information 6-2) added to the blocks 2 and 3 shown in FIG. 15 includes, to indicate that there in no difference in the slot assignment oa, only the assignment information 261. In the assignment information ai'2 (assignment information 6-2), the assignment information 261 is set to the bit "1" which indicates that there in no difference in the slot assignment oa. Consequently, the assignment information ai'2 (assignment information 6-2) is set to the bit-sequence "1". Here, the assignment information ai'3 (assignment information 6-3) is the same as the assignment information ai'2 (assignment information 6-2). The assignment information ai'4 (assignment information 6-4) is set to the bit-sequence "0011101" including the identification information 261 and the slot assignment oa. As described above, for example, between the assignment information ai'1 (assignment information 6-1) and the assignment information ai'2 (assignment information 6-2), there is the difference of 5 bits. Therefore, as shown in the assignment information ai'2 (assignment information 6-2), in the case that there is no difference in the slot assignment oa, by using the format not including the slot assignment oa, the transmission band of the data stream can be effectively used.

These are the operation of the assignment information adding section 115 according to the present exemplary embodiment.

9. Operation of demultiplexing apparatus 1302

Figure 18:
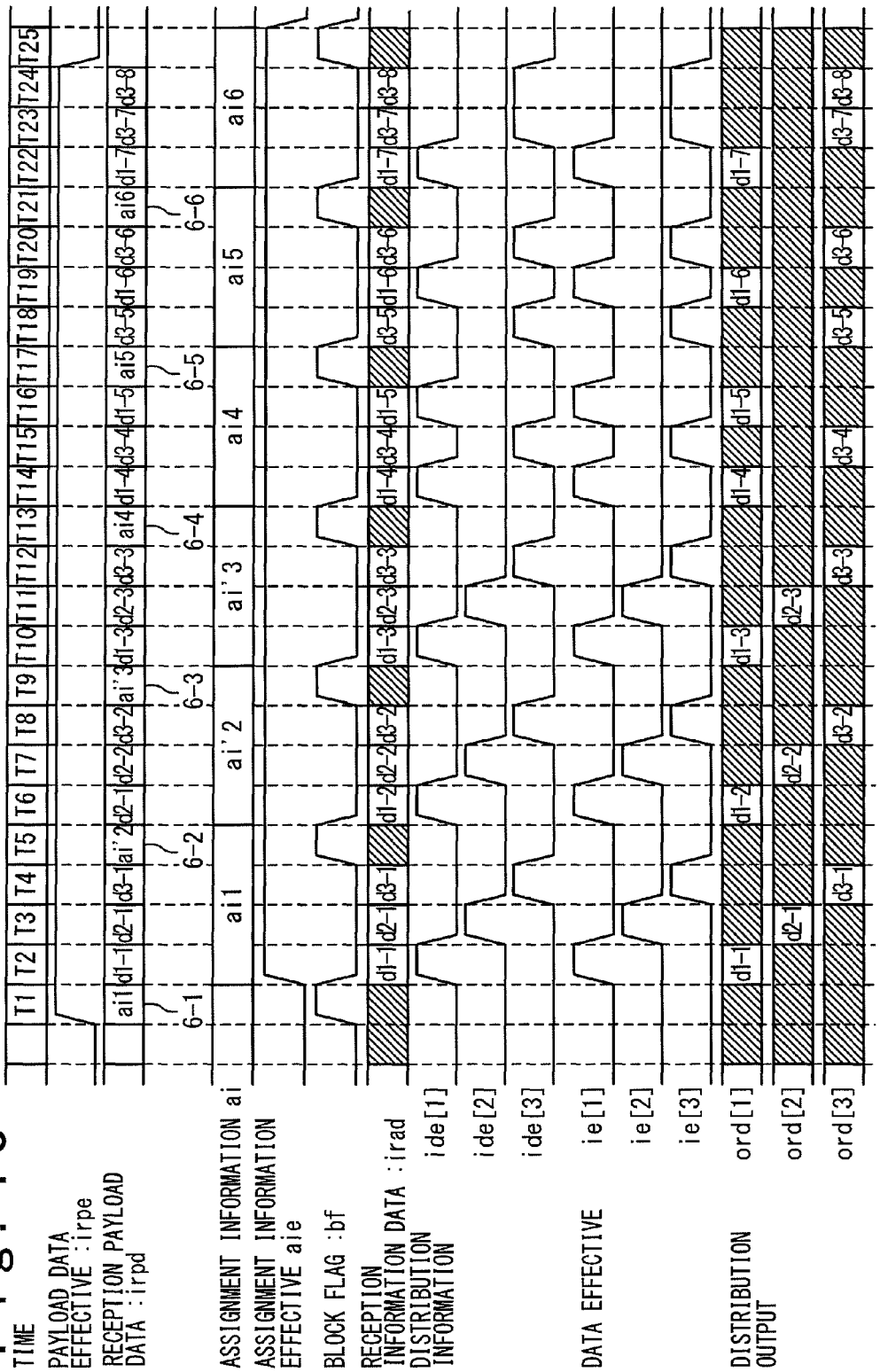
FIG. 18 is a timing chart showing an operation of the demultiplexing apparatus 1302 according to the first exemplary embodiment.

Next, an operation of the demultiplexing apparatus 1302 according to the present exemplary embodiment will be described. FIG. 18 is a timing chart showing the operation of the demultiplexing apparatus 1302 according to the present exemplary embodiment. Here, the timing chart of FIG. 18 shows the case that the number of channels of the demultiplexing apparatus 1302: N=3, the number of slots of the information data 243: p=3, and the channel multiplexing ratio number of the channels: m1 to m3=1. However, the present exemplary embodiment can be applied to the case that the number of channels=N, the number of slots of the information data 243=p, and the channel multiplexing ratio number of the channels=m1 to mn are arbitrary. First, items of FIG. 18 will be described.

The time indicates a time slot. The reception payload data irpd and the payload data effective signal irpe are signals between the frame terminating section 125 and the assignment information detecting section 124. The reception payload data irpd indicates the assignment information ai'1 to ai'4 (assignment information 6-1 to 6-4) of the payload data of the reception frame and the fixed length data 1600 stored in the information data ODAT. Here, for ease of description, the fixed length data d[*]-[#] is used in which the [*] indicates the channel number and the [#] indicates the input order. That is, d1-1 means the fixed length data 1600 of the ch number=1 and the first data. The payload data effective signal irpe indicates whether or not the reception payload data irpd is effective. When the reception payload data irpd is effective, the frame terminating section 125 outputs the payload data effective signal irpe with the high level to the assignment information detecting section 124. On the other hand, when the reception payload data irpd is not effective, the frame terminating section 125 outputs the payload data effective signal irpe with the low level to the assignment information detecting section 124.

The assignment information ai and the assignment information effective signal aie are signals between the assignment information detecting section 124 and the distribution controlling section 123. The assignment information ai indicates the assignment information ai acquired from the reception payload data irpd by the assignment information detecting section 124. The assignment information effective signal aie indicates whether or not the assignment information ai is effective. When the assignment information ai is effective, the assignment information detecting section 124 outputs the assignment information effective signal aie with the high level to the distribution controlling section 123. On the other hand, when the assignment information ai is not effective, the assignment information detecting section 124 outputs the assignment information effective signal aie with the low level to the distribution controlling section 123.

The block flag bf and the reception information data irad are signals between the assignment information detecting section 124 and the distributing section 122. The block flag bf indicates the delimiting positions of the blocks 23 in the reception payload data irpd. When the assignment information detecting section 124 detects the block delimiting positions in the reception payload data irpd, the assignment information detecting section 124 outputs the block flag bf with the high level to the distributing section 122. On the other hand, when the assignment information detecting section 124 does not detect the block delimiting positions in the reception payload data irpd, the assignment information detecting section 124 outputs the block flag bf with the low level to the distributing section 122. The reception information data irad is the fixed length data 1600 in which the assignment information ai is separated from the reception payload data irpd. In FIG. 18, the reception information data irad is the fixed length data 1600 stored in the respective slots in the reception payload data irpd.

The distribution information ide[1] to ide[3] are signals between the distribution controlling section 123 and the distributing section 122. When the fixed length data in the reception information data irad is effective, the distribution controlling section 123 outputs the corresponding distribution information ide[1] to ide[3] with the high level. On the other hand, when the fixed length data in the reception information data irad is not effective, the distribution controlling section 123 outputs the corresponding distribution information ide[1] to ide[3] with the low level.

The data effective signals ie [1] to ie[3] and the distribution outputs ord[1] to ord[3] are signals between the distributing section 122 and the coupling section 121-1 to 121-3. The distribution outputs ord[1] to ord[3] are the fixed length data 1600 distributed to the coupling section 121-1 to 121-3 from the distributing section 122. The data effective signals ie[1] to ie[3] indicate whether or not the fixed length data are effective. When the fixed length data 1600 are effective, the distributing section 122 outputs the data effective signals ie[1] to ie[3] with the high level. On the other hand, when the fixed length data 1600 are not effective, the distributing section 122 outputs the data effective signals ie[1] to ie[3] with the low level.

Hereinafter, with reference to FIGS. 12 and 18, the operation of the demultiplexing apparatus 1302 will be described. First, the frame terminating section 125 receives the data stream from the transmission channel 1304. The frame terminating section 125 detects frames 21 from the data stream. The frame terminating section 125 outputs the reception payload effective signal irpe with the high level to the assignment information detecting section 124. At the same time, the frame terminating section 125 outputs the reception payload data irpd to the assignment information detecting section 124. Here, the assignment information 6-1 to 6-6 shown in FIG. 18 indicates the assignment information ai.

Next, the assignment information detecting section 124 receives the reception payload data effective signal irpe and the reception payload data irpd from the frame terminating section 125. The assignment information detecting section 124 detects the assignment information ai form the reception payload data irpd in response to the irpe with the high level. The assignment information detecting section 124 sets the assignment information effective signal aie to the high level and outputs it to the distribution controlling section 123. At the same time, the assignment information detecting section 124 outputs the assignment information ai to the distribution controlling section 123. In addition, the assignment information detecting section 124 sets the block flag bf indicating the block delimiting position to the high level every time when detecting the assignment information ai, and outputs it to the distributing section 122. At the same time, the assignment information detecting section 124 outputs the reception information data irad, which is the result of subtracting the assignment information ai from the reception payload data irpd, to the distributing section 122.

Subsequently, the distribution controlling section 123 receives the assignment information ai and the assignment information effective signal aie from the assignment information detecting section 124. The distribution controlling section 123 creates the distribution information ide[1] to ide [3] based on the assignment information ai in response to the assignment information effective signal aie with the high level. The distribution controlling section 123 sets the distribution information ide[1] to ide[3] corresponding to the channel shown in the assignment information ai to the high level and outputs them. Here, when the identification signal 261 included in the assignment information ai is the bit "1", namely, the identification signal 261 indicates that the slot assignment oa are not different, the distribution controlling section 123 creates the distribution information ide[1] to ide [3] which are the same as those of the previous block just one time before. On the other hand, when the identification signal 261 included in the assignment information ai is the bit "0", namely, the identification signal 261 indicates that the slot assignment oa are different, the distribution controlling section 123 creates the distribution information ide[1] to ide[3] based on the slot assignment oa included in the assignment information ai. The distribution controlling section 123 outputs the distribution information ide[1] to ide[3] to the distributing section 122.

The distributing section 122 receives the distribution information ide[1] to ide[3] from the distribution controlling section 123. In addition, the distributing section 122 receives the block flag bf and the reception information data irad from the assignment information detecting section 124. The distributing section 122 outputs the fixed length data 1600 of the slot 25, which corresponds to the channel having the distribution information ide[1] to ide[3] with the high level, from the information data irad to the coupling sections 121-1 to 121-3 corresponding to the channel as the distribution output ord. At this time, the distributing section 122 outputs the data effective signals ie[1] to ie[3] together with the distribution outputs ord[1] to ord[3] to the coupling sections 121-1 to 121-3 corresponding to the channel. For example, in the T2 of FIG. 18, the distributing section 122 receives the distribution information ide[1] with the high level from the distribution controlling section 123. The distributing section 122 outputs the fixed length data (d1-1) of the reception information data irad corresponding to the distribution information ide[1] and the data effective signal ie[1] set to the high level to the coupling section 121-1 corresponding to the channel 1.

Next, the coupling sections 121-1 to 121-3 receive the distribution outputs ord[1] to ord[3] and the data effective signals ie[1] to ie[3] from the distributing section 122. The coupling sections 121-1 to 121-3 decode the fixed length data 1600 as the distribution outputs ord [1] to ord [3] by using the 8B/10B conversion code or the 64B/66B conversion code, in response to the data effective signals ie with the high level. The coupling sections 121-1 to 121-3 store decoded data and output the information signals 1306-1 to 1306-3 to respective channels every time when detecting the delimiting positions of the information signals 1306-1 to 1306-3 in the decoded data. Here the coupling sections 121-1 to 121-3 continuously output the IFG (Inter Frame Gap) to the respective channels when outputting no information signal 1306-1 to 1306-3.

Here, as shown in FIG. 18, in confirming the distribution outputs ord[1] to ord[3] in the T2 to T12, ch1:ch2:ch3 is 1:1:1, which satisfies the channel multiplexing ratio number m of ch1:ch2:ch3=1:1:1. In addition, in confirming the distribution outputs ord[1] to ord[3] in the T14 to T20, ch1:ch3 is 1:1, which satisfies the channel multiplexing ratio number m even in the situation that there is no fixed length data 1600 in the ch2.

These are the description of the operation of the demultiplexing apparatus 1302 according to the present exemplary embodiment.

In this way, the cyclic output ch determining section 332 of the assignment controlling section 113 according to the present exemplary embodiment determines the channels for the storing sections 112-1 to 112-N which store the readable fixed length data 1600 in the cyclic manner. In addition, the assignment calculating section 331 stores the number of slots capable of being assigned to the fixed length data 1600 in one block and the channel multiplexing ratio number indicating that the numbers of slots assigned for the respective channels. The assignment calculating section 331 assigns the slots of the channel multiplexing ration number to the slots of each block. Therefore, the assignment calculating section 331 can multiplex the respective channels in an arbitrary ratio based on the channel multiplexing ratio number.

In addition, in the assignment information ai, the channel assignment situation to the slots in the block is stored as the slot assignment oa. The assignment information ai also includes the identification signal 261 indicating the omission of the slot assignment when the blocks with the same slot assignment continues. Therefore, even if the channel multiplexing ratio number is changed in the side of the multiplexing apparatus 1301, the demultiplexing can be performed flexibly and appropriately based on the slot assignment in the side of the demultiplexing apparatus 1302. When the multiplexing ratio is not changed, by omitting the slot assignment oa of the assignment information ai, the transmission band of the transmission channel 1304 can be effectively used.

These are the description of the multiplexing transmission system according to the present exemplary embodiment. Here, in the present exemplary embodiment, the information signals 1305-1 to 1305-N as the input signals are the MAC frames with variable length. However, the present exemplary embodiment can be applied to the protocols such as IPv4 (Internet Protocol version 4), IPv6 (Internet Protocol Version 6), TCP (Transmission Control Protocol), UDP (User Datagram Protocol).

In addition, in the present exemplary embodiment, the dividing sections 111-1 to 111-N encode the information signals 1305-1 to 1305-N to create the fixed length data, and the coupling section 121-1 to 121-N decode the fixed length data to create the information signals 1306-1 to 1306-N. However, the encoding processing and decoding processing are not limited to the execution of the dividing sections 111-1 to 111-N and the coupling sections 121-1 to 121-N. The multiplexing apparatus 1301 may receive the fixed length data which has been already encoded by the previous stage processor. The demultiplexing apparatus 1302 may execute the decoding by using another post-stage processing.

Furthermore, in the present exemplary embodiment, the case that the MAC frames are transmitted as the multiplexing signals is described. However, as the multiplexing signals, frames other than the MAC frames may be used, and the present exemplary embodiment may be applied to the communication network not including the IFG.

Figure 19:
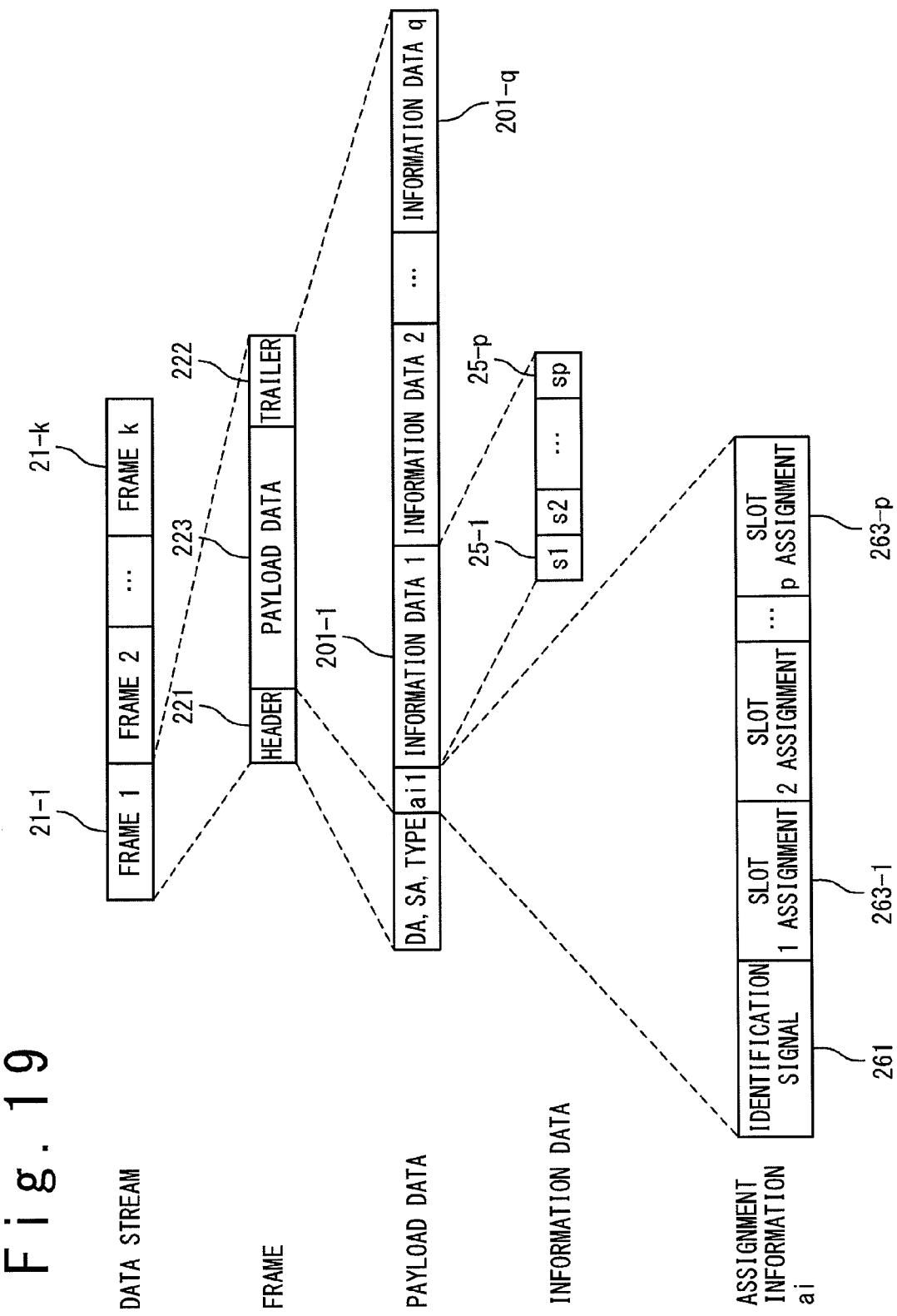
FIG. 19 is a view showing another frame configuration of the data stream transmitted by the multiplexing transmission system according to the first exemplary embodiment.

In addition, in the present exemplary embodiment, the assignment information ai is added to each block. However, the assignment information ai may be stored in the payload data 223 included in the frame 21. FIG. 19 is a view showing another frame configuration of the data stream transmitted by the multiplexing transmission system according to the present exemplary embodiment. As shown in FIG. 19, the payload data 223 may have the frame configuration in which the assignment information ai and the information data 201-1 to 201-q including the slots 25-1 to 25-p are stored. In this case, the slot assignment in the information data 201-1 to 201-q is based on the assignment information ai. The assignment information ai may be stored in the header 221.

Second Exemplary Embodiment

Next, the multiplexing transmission system according to the second exemplary embodiment of the present invention will be described.

The present exemplary embodiment will be described by using a network switch as an example. Here, the network switch multiplexes information signals of variable length frames such as MAC frames of Ethernet (registered trademark) included in a plurality of transmission queues in the order from the information signal stored in the queue of the higher priority in the strict priority.

Here, the strict priority is the conventional method in which the strict priority transmission is carried out based on the priority order of the priority queue. In the strict priority, the MAC frames stored in the queues of the higher priority are transmitted in first. In addition, in the strict priority, until all of the queues of the higher priority are transmitted, the queues of the lower priority are not transmitted.

[Configuration]

Figure 20:
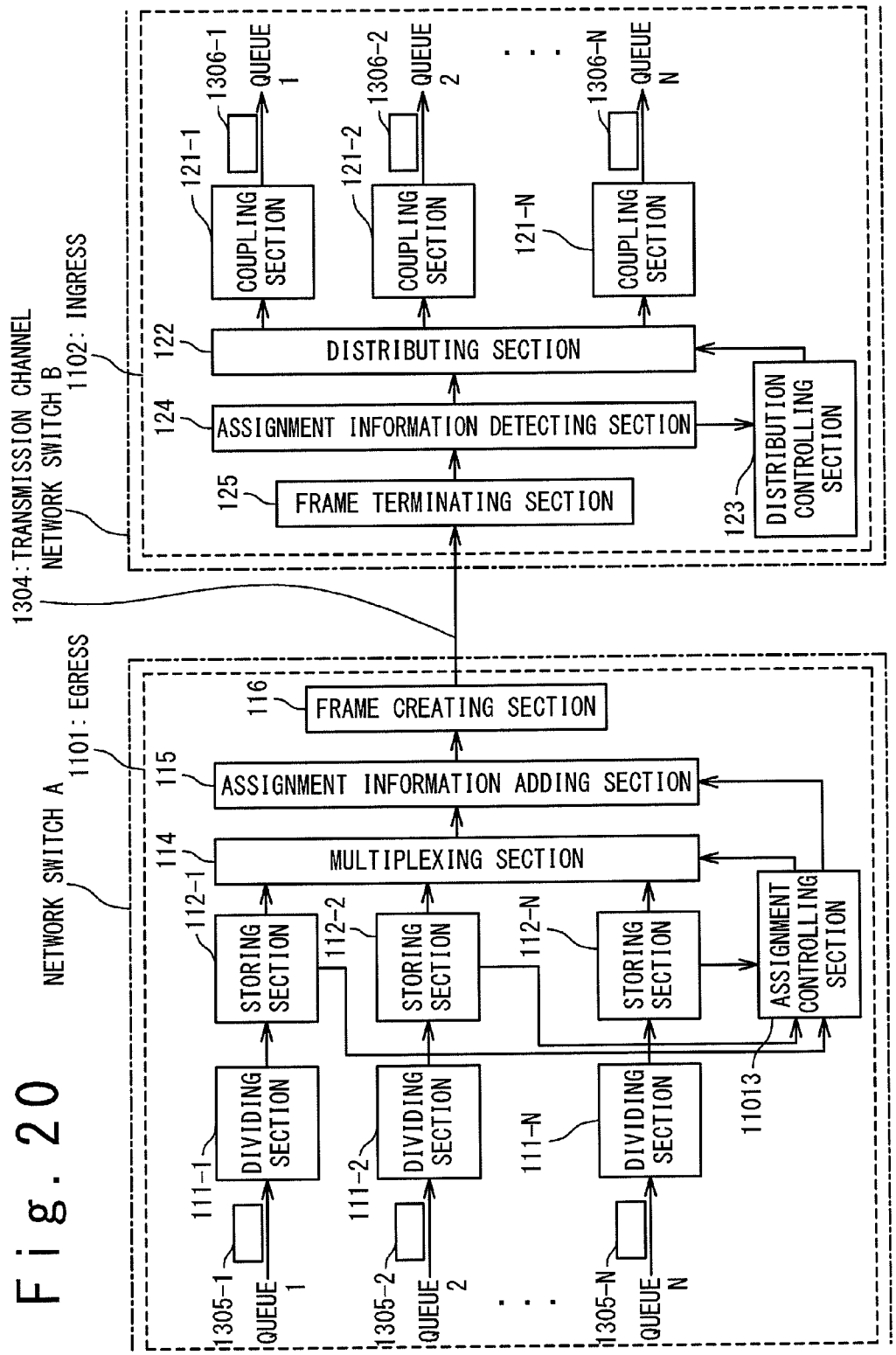
FIG. 20 is a functional block diagram showing a configuration of a multiplexing transmission system according to a second exemplary embodiment.

First, a configuration of the multiplexing transmission system according to the present exemplary embodiment will be described. FIG. 20 is a functional block diagram showing the configuration of the multiplexing transmission system according to the present exemplary embodiment. The multiplexing transmission system according to the present exemplary embodiment includes an egress 1101 of a network switch A and an ingress 1102 of a network switch B. The egress 1101 and the ingress 1102 of the multiplexing transmission system according to the present exemplary embodiment are approximately similar to the multiplexing apparatus 1301 and the demultiplexing apparatus 1302 according to the first exemplary embodiment. Therefore, hereinafter, the description for the portions same as those of the first exemplary embodiment is omitted and the portions different from those of the first exemplary embodiment will be described.

The egress 1101 is the output side of the network switch A. The ingress 1102 is the input side of the network switch B. The egress 1101 and the ingress 1102 are connected via the transmission channel 1304. The egress 1101 is connected to the output sides of the priority queues 1 to N and receives the information signals 1305-1 to 1305-N of the MAC frames from the priority queues 1 to N.

The ingress 1102 is connected to the input sides of the priority queues 1 to N and outputs the information signals 1306-1 to 1306-N to the priority queues 1 to N. In the present exemplary embodiment, let us suppose that the priority queue 1 has the highest priority and the priority queue N has the lowest priority. The egress 1101 executes the queue control using the strict priority method and multiplexes the MAC frames supplied from the respective queues to output it to the transmission channel 1304.

The egress 1101 includes the dividing sections 111-1 to 111-N, the storing sections 112-1 to 112-N, an assignment controlling section 11013, the multiplexing section 114, the assignment information adding section 115 and the frame creating section 116.

The dividing section 111-1 to 111-N is connected to the previous stage queues 1 to N (not shown) and the storing sections 112-1 to 112-N, respectively. The storing sections 112-1 to 112-N is connected to the dividing sections 111-1 to 111-N, respectively, the multiplexing section 114 and the assignment controlling section 11013. The assignment controlling section 11013 is connected to the storing sections 112-1 to 112-N, the multiplexing section 114 and the assignment information adding section 115. The multiplexing section 114 is connected to the storing sections 112-1 to 112-N, the assignment controlling section 11013 and the assignment information adding section 115. The assignment information adding section 115 is connected to the multiplexing section 114, the assignment controlling section 11013 and the frame creating section 116. The frame creating section 116 is connected to the assignment information adding section 115 and the transmission channel 1304.

The ingress 1102 includes the coupling sections 121-1 to 121-N, the distributing section 122, the distribution controlling section 123, the assignment information detecting section 124 and the frame terminating section 125.

The frame terminating section 125 is connected to the transmission channel 1304 and the assignment information detecting section 124. The assignment information detecting section 124 is connected to the frame terminating section 125, the distribution controlling section 123 and the distributing section 122. The distribution controlling section 123 is connected to the assignment information detecting section 124 and the distributing section 122. The distributing section 122 is connected to the assignment information detecting section 124, the distribution controlling section 123 and the coupling sections 121-1 to 121-$n$. The coupling sections 121-1 to 121-$n$ are connected to the distributing section 122 and the post-stage processors (not shown) which are output sides of the priority queues 1 to N.

In the present exemplary embodiment, the portion different from the first exemplary embodiment is the assignment controlling section 11013 of the egress 1101. Therefore, hereinafter, the assignment controlling section 11013 will be mainly described. In addition, hereinafter, the queues 1 to N will be expressed as the channels 1 to N similarly to the first exemplary embodiment.

FIG. 21 is a view showing the configuration of the assignment controlling section 11013 and the flow of signals in the egress 1101 according to the present exemplary embodiment. The assignment controlling section 11013 according to the present exemplary embodiment includes an assignment calculating section 12031 and a priority output ch determining section 12032.

The priority output ch determining section 12032 is connected to the storing sections 112-1 to 112-N and the assignment calculating section 12031. The priority output ch determining section 12032 receives the effective data numbers EMP[1] to EMP[N] from the storing sections 112-1 to 112-N. When receiving the next output ch determination instruction EN from the assignment calculating section 12031, the priority output ch determining section 12032 determines a next priority ch from which the fixed length data 1600 can be read next. That is, the priority output ch determining section 12032 does not select the channel from which the fixed length data 1600 cannot be read because the fixed length data 1600 is not stored. In addition, the priority output ch determining section 12032 does not select the channel with lower priority even though the fixed length data 1600 can be read from the channel with lower priority, if the readable fixed length data 1600 is stored in the storing sections 112-1 to 112-N corresponding to the channel with higher priority. The priority output ch determining section 12032 outputs the determined channel as the ch number i to the assignment calculating section 12031. In addition, the priority output ch determining section 12032 creates the all chs effective data no signal AEMP indicating that there is no channel from which the fixed length data 1600 can be read, if all of the storing sections 112-1 to 112-N do not have any fixed length data 1600, and output it to the assignment calculating section 12031.

The assignment calculating section 12031 has the configuration same as that of the first exemplary embodiment. The assignment calculating section 12031 is connected to the priority output ch determining section 12032, the multiplexing section 114 and the assignment information adding section 115. The assignment calculating section 12031 stores the assignment capable slot number indicating the number of slots capable of being assigned to the information data 243 including a plurality of slots and the channel multiplexing ratio number indicating the numbers of slots to be assigned to respective channels at one time. The assignment calculating section 12031 assigns the slot to the ch number i supplied from the priority output ch determining section 1203 based on the assignment capable slot number and the channel multiplexing ratio number. In this case, the number of slots assigned to each channel is the channel multiplex ratio number set for each channel. The assignment calculating section 12031 subtracts the number of assigned slots from the assignment capable number w after the completion of the channel assignment. The assignment calculating section 12031 repeats this processing until the assignment capable number w becomes "0". The assignment calculating section 12031 finishes the assignment of the slot to one information data 243 when the assignment capable number w becomes "0". The assignment calculating section 12031 outputs the result of the slot assignment as the slot assignment oa, the slot number SN and the block number BN to the multiplexing section 114 and the assignment information adding section 115. The assignment calculating section 12031 outputs the assignment instruction RE to the multiplexing section 114.

These are the description of the configuration of the multiplexing transmission system according to the present invention.

[Operation]

Next, the operation of the multiplexing transmission system according to the present exemplary embodiment will be described. The multiplexing transmission system according to the present exemplary embodiment is different from the first exemplary embodiment in the operation of the assignment controlling section 11013. Therefore, hereinafter, the operation of the assignment controlling section 11013 will be described and the description for the other operation is omitted. Hereinafter, with reference to FIG. 13, the operation of the assignment controlling section 11013 will be described.

The priority output ch determining section 12032 receives the effective data numbers EMP[1] to EMP[N] from the storing sections 112-1 to 112-N. The priority output ch determining section 12032 creates the all chs effective data no signal AEMP to output it to the assignment calculating section 12031. In addition, when the all chs effective data no signal AEMP supplied from the priority output ch determining section 12032 becomes the low level, the assignment calculating section 12031 sets the next output ch determination instruction EN to the high level and outputs it to the priority output ch determining section 12032. When the next output ch determination instruction EN with the high level is supplied from the assignment calculating section 12031, the priority output ch determining section 12032 determines the channel which has the highest priority in the channels corresponding to the storing sections 112-1 to 112-N enabling to output the fixed length data 1600 and outputs the determined ch number i and the effective data number EMP of the ch number i as the effective data number SEMP for the determined ch to the assignment calculating section 12031.

That is, the priority output ch determining section 12032 selects the channel in the order form the channel with the higher priority. The priority output ch determining section 12032 does not select the channel with lower priority even though the readable fixed length data 1600 is stored in the channel with lower priority, until the effective data number EMP of the channel with high priority becomes "0". Here, the operation of the assignment calculating section 12031 has already described with reference to FIGS. 14A and 14B in the first exemplary embodiment, the description is omitted.

These are the description of the operation of the multiplexing transmission system according to the present exemplary embodiment.

Up to here, the multiplexing transmission system according to the present exemplary embodiment is described. As described above, in the present exemplary embodiment, the priority output ch determining section 12032 of the assignment controlling section 11013 holds the number of slots capable of being assigned to one block and assigns the slots to each block. Therefore, a specific ch can be preferentially multiplexed.

In addition, even though the effective data number EMP of the certain channel becomes "0" during the slot assignment, the assignment calculating section 12031 can immediately assign the slot to the channel with the next high priority. Therefore, the transmission band can be effectively used.

Further, even though the readable fixed length data 1600 is supplied to the channel with the high priority during the slot assignment of the channel with the low priority, the assignment calculating section 12031 can assign the slot to the fixed length data 1600 of the channel with the high priority immediately after the channel multiplexing ratio number remaining number y of the current processing becomes "0". Therefore, the real time property of the channel with the high priority can be secured.

These are the description of the multiplexing system according to the present exemplary embodiment.

The first effect of the present invention is that even though the number of slots of a block and the number of input channels does not coincide with each other, transmission bands can be assigned to respective channels in an arbitrary multiplexing ratio. This is because the assignment controlling section 113 selects fixed length data 1600 corresponding to the respective channels in a cyclic manner based on an arbitrary channel multiplexing ratio number, and assigns the slots to them. In addition, in the second exemplary embodiment, since the priority output ch determining section 12032 assign the slots to the fixed length data 1600 of the channel in the order from the higher priority, the priority assignment of the transmission bands can be realized.

The second effect is that the transmission bands can be effectively used. This is because even though no signal situation occurs in the information signals 1305-1 to 1305-N, the assignment controlling section 113 can execute the slot assignment to another channel having input signals at the arbitrary multiplexing ratio based on the channel multiplexing ratio number.

The third effect is that the consumption of the transmission bands can be suppressed. This is because when the slot assignment oa of the previous block and the slot assignment oa of the present block coincide with each other, the assignment information adding section 115 adds only the identification information 261 to the block as the assignment information ai added for each block. Here, by adding the assignment information ai to each frame, the consumption of the transmission bands can be further suppressed.

The forth effect is that the influence of the frame length of the information signals 1305-1 to 1305-N supplied from the respective channels can be prevented. This is because the multiplexing section 114 performs the multiplexing processing in units of the fixed length data 1600 divided by the dividing section 111-1 to 111-N. Therefore, while the real time property of the high priority traffic can be secured, the information signals 1305-1 to the 1305-N including the signals of other channels with the low priority can be multiplexed.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims. In addition, the present invention can be also realized by combining the first exemplary embodiment and the second exemplary embodiment.

This application is based upon and claims the benefit of priority from Japanese patent application No. 2009-077717 filed on Mar. 26, 2009, the disclosure of which is incorporated herein in its entirety by reference.

The invention claimed is:

1. A multiplexing transmission system comprising:
 a multiplexing apparatus including:
  a dividing section that divides information signals received from a plurality of channels to create fixed length data each having a predetermined fixed length,
  a storing section that relates said fixed length data to said plurality of channels to store said fixed length data,
  an assignment controlling section that stores channel multiplexing ratio number indicating a ratio of said fixed length data stored in a payload of a multiplexing frame among said plurality of channels, select each channel cyclically to determines an output channel, and output an assignment instruction for acquiring said fixed length data based on said channel multiplexing ratio number of said output channel,
  a multiplexing section that acquires said fixed length data from said storing section every time receiving said assignment instruction to store said fixed length data in said payload in turn,
  an assignment information adding section that adds assignment information to said payload, said assignment information including a channel arrangement of each channel of said fixed length data stored in said payload, and a frame creating section that creates multiplexing frame from said payload to transmit said multiplexing frame to a transmission channel; and a demultiplexing apparatus that includes:
a frame terminating section that receives said multiplexing frame from said transmission channel,
an assignment information detecting section that detects said assignment information from said payload of said multiplexing frame to create distribution information for distributing said fixed length data to said each channel based on said assignment information,
a distributing section that detects said fixed length data from said payload to distribute said fixed length data to said each channel based on said distribution information, and
a coupling section that couples said fixed length data to reproduce said information signal.

2. The multiplexing transmission system according to claim 1, wherein said assignment information includes:
an identification signal indicating whether or not said channel arrangement of said payload to which said assignment information is going to be added coincides with said channel arrangement of just before assignment information added to a just before payload which was processed just before said payload, and
slot assignment indicating said channel arrangement of said payload to which said assignment information is added,
wherein said assignment information detecting section creates said distribution information based on said slot assignment included in said assignment information detected from said payload.

3. The multiplexing transmission system according to claim 2, wherein when said channel arrangement of said payload to which said assignment information is going to be added coincides with said channel arrangement of said just before assignment information, said assignment information adding section adds said assignment information, which includes only a coinciding identification signal indicating that said channel arrangement of said payload coincides with said channel arrangement of said just before assignment information, to said payload, and
wherein when said assignment information detected from said payload includes said coinciding identification signal, said assignment information detecting section creates said distribution information which is the same as that used in said process for said just before payload.

4. The multiplexing transmission system according to claim 1, wherein said payload is divided into a plurality of blocks,
wherein each of said plurality of blocks is divided into a plurality of slots,
wherein said multiplexing section stores said fixed length data in said plurality of slots,
wherein said assignment information adding section adds said assignment information including said channel arrangement of said fixed length data in said plurality of slots to each block,
wherein said frame creating section creates said payload by coupling said each block and creates said multiplexing frame by using said payload, and
wherein said assignment information detecting section detects said assignment information in units of said each block and creates said distribution information in units of said each block based on said assignment information.

5. The multiplexing transmission system according to claim 1, wherein said assignment controlling section includes:
a cyclic output channel determining section that selects an output channel by circulating around said each channel, and output the number of said fixed length data stored in said storing section corresponding to said output channel, and
an assignment calculating section that adds said output channel, one block of said each block which makes said fixed length data acquired from said output channel be stored in said payload and one slot of said each slot included in said one block to said assignment instruction to output said assignment instruction.

6. The multiplexing transmission system according to claim 5, wherein said cyclic output channel determining section does not select a channel of said each channel, of which said fixed length data is not stored in said storing section, as said output channel.

7. The multiplexing transmission system according to claim 6, wherein said assignment calculating section previously memorizes an assignment capable number of said fixed length data which can be stored in a block, calculates remains of said assignment capable number every time when said assignment instruction outputs, ends said storing of said fixed length data to said block when said assignment capable number becomes "0", and then start an assignment of said fixed length data to a block next to said block.

8. The multiplexing transmission system according to claim 7, wherein said assignment calculating section memorizes an acquisition upper limit number to which said fixed length data is acquired from said output channel based on said channel multiplexing ration number and an output channel storing number of said fixed length data stored in said output channel in said storing section, calculates remains of said acquisition upper limit number and remains of said output channel storing number every time when said assignment instruction is output, ends said output of said assignment instruction to said output channel when any of said acquisition upper limit number and said output channel storing number becomes "0" or less, and then start an output of said assignment instruction to a channel next to said output channel.

9. The multiplexing transmission system according to claim 5, wherein a priority indicating an priority order for outputting said information signal is set in said each channel,
wherein said cyclic output channel determining section selects said output channel in the order from said channel with said higher priority based on said priority.

10. The multiplexing transmission system according to claim 5, wherein said cyclic output channel determining section receives said storing number of said fixed length data of said each channel from said storing section.

11. The multiplexing transmission system according to claim 1, wherein said dividing section and said storing section are provided corresponding to said each channel.

12. The multiplexing transmission system according to claim 1, wherein said information signal is provided with one of a variable length frame and an arbitrary length packet.

13. The multiplexing transmission system according to claim 12, wherein said variable length frame includes a MAC (Media Access Control) frame.

14. The multiplexing transmission system according to claim 1, wherein said information signal includes said fixed length data preliminarily divided into said fixed length.

15. A multiplexing apparatus used for a multiplexing transmission system including:
a multiplexing apparatus, and
a demultiplexing apparatus,
said multiplexing apparatus comprising:
a dividing section that divides information signals received from a plurality of channels to create fixed length data each having a predetermined fixed length;
a storing section that relates said fixed length data to said plurality of channels to store said fixed length data;
an assignment controlling section that stores a channel multiplexing ratio number indicating a ratio of said fixed length data stored in a payload of a multiplexing frame among said plurality of channels, select each channel cyclically to determines an output channel, and output an assignment instruction for acquiring said fixed length data based on said channel multiplexing ratio number of said output channel;
a multiplexing section that acquires said fixed length data from said storing section every time receiving said assignment instruction to store said fixed length data in said payload in turn;
an assignment information adding section that adds assignment information to said payload, said assignment information including a channel arrangement of each channel of said fixed length data stored in said payload; and
a frame creating section that creates said multiplexing frame from said payload to transmit said multiplexing frame to a transmission channel,
wherein said demultiplexing apparatus includes:
a frame terminating section that receives said multiplexing frame from said transmission channel,
an assignment information detecting section that detects said assignment information from said payload of said multiplexing frame to create distribution information for distributing said fixed length data to said each channel based on said assignment information,
a distributing section that detects said fixed length data from said payload to distribute said fixed length data to said each channel based on said distribution information, and
a coupling section that couples said fixed length data to reproduce said information signal.

16. A demultiplexing apparatus used for a multiplexing transmission system including:
a multiplexing apparatus, and
a demultiplexing apparatus,
wherein said multiplexing apparatus includes:
a dividing section that divides information signals received from a plurality of channels to create fixed length data each having a predetermined fixed length,
a storing section that relates said fixed length data to said plurality of channels to store said fixed length data,
an assignment controlling section that stores a channel multiplexing ratio number indicating a ratio of said fixed length data stored in a payload of a multiplexing frame among said plurality of channels, select each channel cyclically to determines an output channel, and output an assignment instruction for acquiring said fixed length data based on said channel multiplexing ratio number of said output channel,
a multiplexing section that acquires said fixed length data from said storing section every time receiving said assignment instruction to store said fixed length data in said payload in turn,
an assignment information adding section that adds assignment information to said payload, said assignment information including a channel arrangement of each channel of said fixed length data stored in said payload, and
a frame creating section that creates said multiplexing frame from said payload to transmit said multiplexing frame to a transmission channel,
said demultiplexing apparatus comprising:
a frame terminating section that receives said multiplexing frame from said transmission channel;
an assignment information detecting section that detects said assignment information from said payload of said multiplexing frame to create distribution information for distributing said fixed length data to said each channel based on said assignment information;
a distributing section that detects said fixed length data from said payload to distribute said fixed length data to said each channel based on said distribution information; and
a coupling section that couples said fixed length data to reproduce said information signal.

17. A multiplexing transmission method in a multiplexing transmission system including a multiplexing apparatus and a demultiplexing apparatus, said method comprising:
dividing information signals supplied from a plurality of channels to create fixed length data each having a predetermined fixed length;
relating said fixed length data to said plurality of channels and storing said fixed length data;
storing a channel multiplexing ratio number indicating a ratio of said fixed length data stored in a payload of a multiplexing frame among said plurality of channels;
selecting said each channel cyclically to determine an output channel;
outputting an assignment instruction for acquiring said fixed length data based on said channel multiplexing ratio number of said output channel;
acquiring said fixed length data from said storing fixed length data step every time receiving said assignment instruction to store said fixed length data in said payload in turn;
adding assignment information to said payload, said assignment information including a channel arrangement of each channel of said fixed length data stored in said payload;
creating said multiplexing frame from said payload to transmit said multiplexing frame to a transmission channel;
receiving said multiplexing frame from said transmission channel;
detecting said assignment information from said payload of said multiplexing frame to create distribution information for distributing said fixed length data to said each channel based on said assignment information;
detecting said fixed length data from said payload to distribute said fixed length data to said each channel based on said distribution information; and
coupling said fixed length data to reproduce said information signal.

18. The multiplexing transmission method according to claim 17, wherein said assignment information includes:
an identification signal indicating whether or not said channel arrangement of said payload to which said assignment information is going to be added coincides with said channel arrangement of just before assignment information added to a just before payload which was processed just before said payload, and slot assignment indicating said channel arrangement of said payload to which said assignment information is added, wherein said step of creating said distribution information includes:

creating said distribution information based on said slot assignment included in said assignment information detected from said payload.

19. The multiplexing transmission method according to claim 18, wherein said step of adding said assignment information to said payload includes:

when said channel arrangement of said payload to which said assignment information is going to be added coincides with said channel arrangement of said just before assignment information, adding said assignment information, which includes only a coinciding identification signal indicating that said channel arrangement of said payload coincides with said channel arrangement of said just before assignment information, to said payload, and wherein said step of creating said distribution information includes:

when said assignment information detected from said payload includes said coinciding identification signal, creating said distribution information which is the same as that used in said process for said just before payload.

20. The multiplexing transmission method according to claim 17, wherein said payload is divided into a plurality of blocks, wherein each of said plurality of blocks is divided into a plurality of slots, wherein said step of acquiring and storing in said payload in turn includes:

storing said fixed length data in said plurality of slots, wherein said step of adding said assignment information to said payload includes:

adding said assignment information including said channel arrangement of said fixed length data in said plurality of slots to each block, wherein said step of creating and transmitting said multiplexing frame to said transmission channel includes:

creating said payload by coupling said each block and creating said multiplexing frame by using said payload, and wherein said step of creating said distribution information includes:

detecting said assignment information in units of said each block and creating said distribution information in units of said each block based on said assignment information.

21. The multiplexing transmission method according to claim 17, wherein said step of adding said assignment information to said payload includes:

selecting an output channel by circulating around said each channel, outputting the number of said fixed length data stored in said storing fixed length data step corresponding to said output channel, and adding said output channel, one block of said each block which makes said fixed length data acquired from said output channel be stored in said payload and one slot of said each slot included in said one block to said assignment instruction to output said assignment instruction.

22. The multiplexing transmission method according to claim 21, wherein said step of selecting said output channel includes:

not selecting a channel of said each channel, of which said fixed length data is not stored in said storing fixed length data step, as said output channel.

23. The multiplexing transmission method according to claim 22, wherein said step of adding and outputting said assignment instruction includes:

previously memorizing an assignment capable number of said fixed length data which can be stored in a block, calculating remains of said assignment capable number every time when said assignment instruction outputs, and ending said storing of said fixed length data to said block when said assignment capable number becomes "0", and then starting an assignment of said fixed length data to a block next to said block.

24. The multiplexing transmission method according to claim 23, wherein said step of adding and outputting said assignment instruction includes:

memorizing an acquisition upper limit number to which said fixed length data is acquired from said output channel based on said channel multiplexing ration number and an output channel storing number of said fixed length data stored in said output channel in said storing fixed length data step, calculating remains of said acquisition upper limit number and remains of said output channel storing number every time when said assignment instruction is output, and ending said output of said assignment instruction to said output channel when any of said acquisition upper limit number and said output channel storing number becomes "0" or less, and then starting an output of said assignment instruction to a channel next to said output channel.

25. The multiplexing transmission method according to claim 21, wherein a priority indicating an priority order for outputting said information signal is set in said each channel, wherein said step of selecting said output channel by circulating includes:

selecting said output channel in the order from said channel with said higher priority based on said priority.

26. The multiplexing transmission method according to claim 21, wherein said step of adding said assignment information to said payload includes:

receiving said storing number of said fixed length data of said each channel from said storing fixed length data step.

* * * * *

UNITED STATES PATENT AND TRADEMARK OFFICE
CERTIFICATE OF CORRECTION

| | | |
|---|---|---|
| PATENT NO. | : 8,792,496 B2 | Page 1 of 1 |
| APPLICATION NO. | : 13/260273 | |
| DATED | : July 29, 2014 | |
| INVENTOR(S) | : Masahiro Shigihara and Toru Takamichi | |

Figure 4:
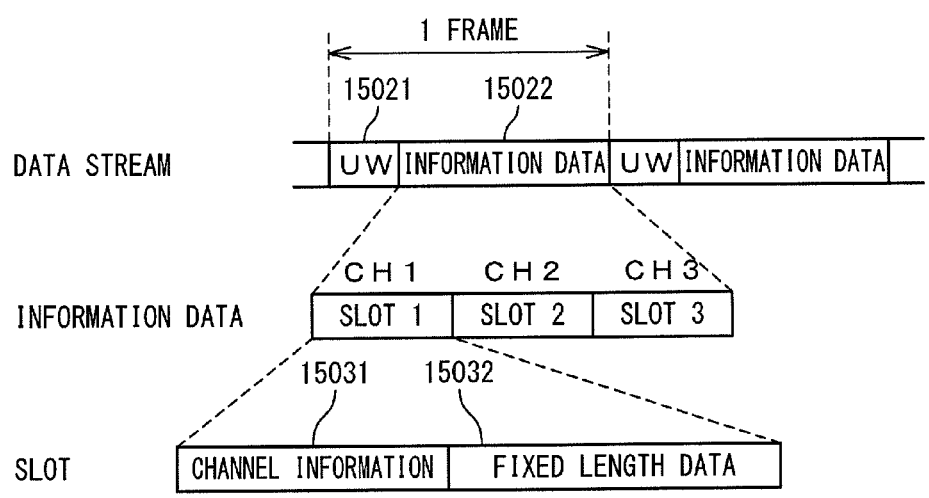
FIG. 4 is a view showing a frame configuration of a data stream transmitted by the broadcast transmitting device in the patent literature 1.
Figure 5B:
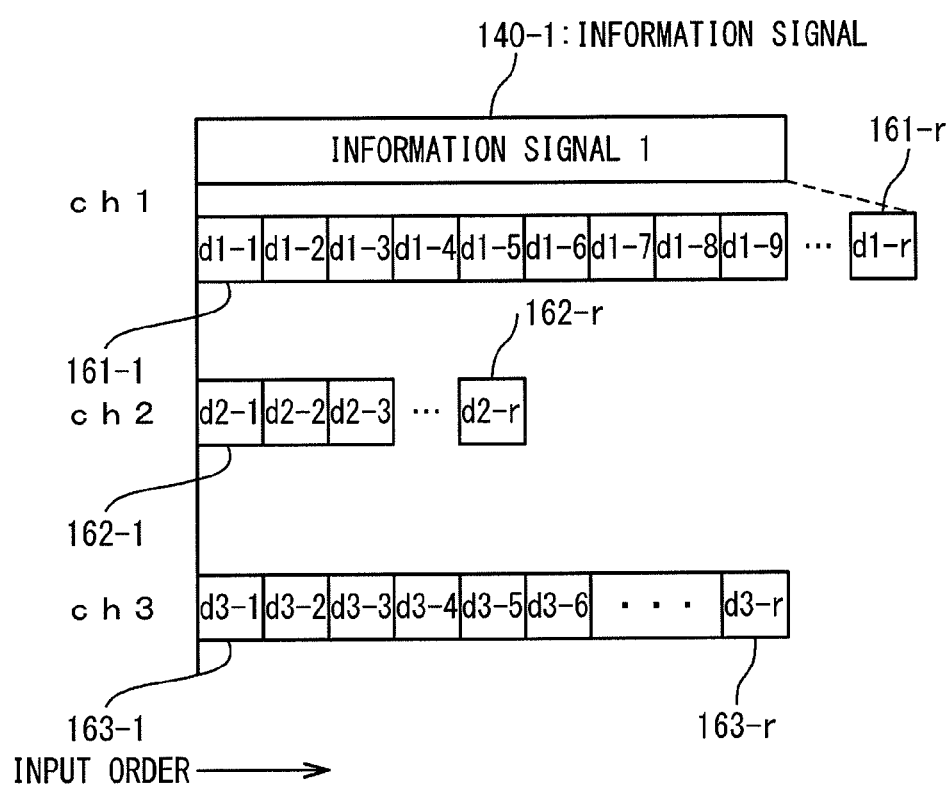
FIG. 5B is a view showing the division of the information signals into the fixed length data in the broadcast transmitting device in the patent literature 1.
Figure 6:
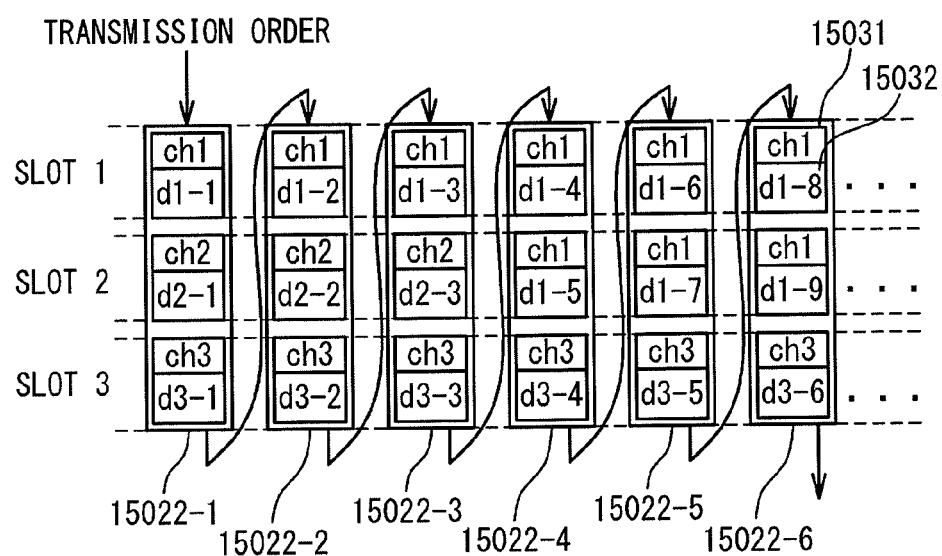
FIG. 6 is a view showing the assignment status of the fixed length data to the respective slots by the multiplexing processing section in the broadcast transmitting device in the patent literature 1.
Figure 7:
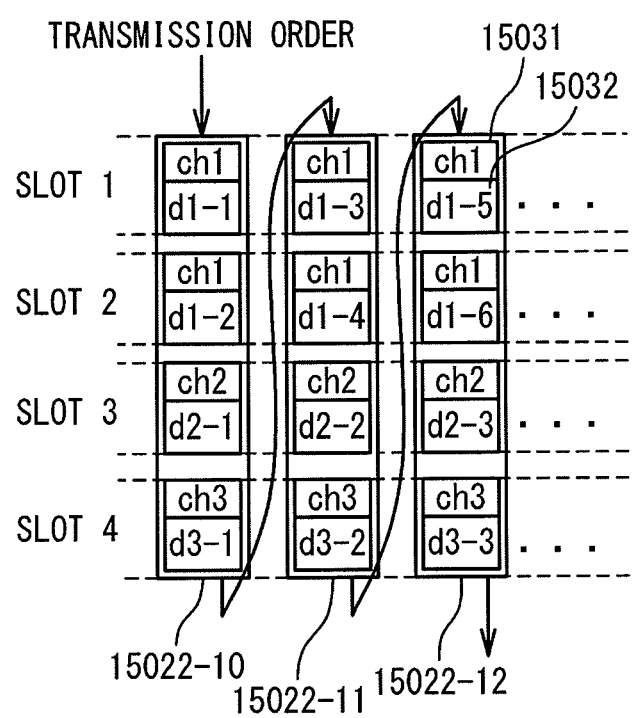
FIG. 7 is a view showing the assignment status of the fixed length data to the respective slots by the multiplexing processing section in the broadcast transmitting device in the patent literature 1.

It is certified that error appears in the above-identified patent and that said Letters Patent is hereby corrected as shown below:

In the Drawings
Drawing Sheet 1 of 24: Above "ch1" insert -- RELATED ART --
Drawing Sheet 2 of 24: Above "Fig. 2A" insert -- RELATED ART --
Drawing Sheet 3 of 24: Above "ch1" insert -- RELATED ART --
Drawing Sheet 4 of 24: Above "Fig. 4" insert -- RELATED ART --
Drawing Sheet 5 of 24: Above "Fig. 5A" insert -- RELATED ART --
Drawing Sheet 6 of 24: Above "Fig. 5B" insert -- RELATED ART --
Drawing Sheet 7 of 24: Above "Fig. 6" insert -- RELATED ART --
Drawing Sheet 8 of 24: Above "Fig. 7" insert -- RELATED ART --

In the Specification
Column 14, Line 25: Delete "number" and insert -- number i --
Column 19, Line 6: Delete "number" and insert -- number i --
Column 22, Line 58: Delete "tare" and insert -- z are --

In the Claims
Column 34, Line 58: In Claim 1, delete "determines" and insert -- determine --
Column 35, Line 4: In Claim 1, after "creates" insert -- said --
Column 37, Line 18: In Claim 15, delete "determines" and insert -- determine --
Column 37, Line 62: In Claim 16, delete "determines" and insert -- determine --

Signed and Sealed this
Seventeenth Day of February, 2015

Michelle K. Lee
*Deputy Director of the United States Patent and Trademark Office*